(12) United States Patent
Golden et al.

(10) Patent No.: US 7,601,264 B2
(45) Date of Patent: Oct. 13, 2009

(54) METHOD FOR TREATMENT OF PLATING SOLUTIONS

(75) Inventors: Josh H. Golden, Santa Cruz, CA (US);
Timothy Weidman, Sunnyvale, CA (US); Peter Porshnev, San Jose, CA (US); Kalyan Sista, Sunnyvale, CA (US); Nikhil Krishnan, New York, NY (US)

(73) Assignee: Applied Materials, Inc., Santa Clara, CA (US)

( * ) Notice: Subject to any disclaimer, the term of this patent is extended or adjusted under 35 U.S.C. 154(b) by 464 days.

(21) Appl. No.: 11/538,467

(22) Filed: Oct. 4, 2006

(65) Prior Publication Data

US 2008/0083673 A1     Apr. 10, 2008

(51) Int. Cl.
*C02F 1/28* (2006.01)
*C02F 1/42* (2006.01)

(52) U.S. Cl. .................. 210/662; 210/664; 210/665; 210/667; 210/669; 210/681; 210/688; 210/719; 210/737; 210/912

(58) Field of Classification Search ............ 210/662, 210/664, 665, 667, 688, 719, 737, 912
See application file for complete search history.

(56) References Cited

U.S. PATENT DOCUMENTS

| | | | |
|---|---|---|---|
| 3,755,530 A | 8/1973 | Avila, et al. |
| 3,770,630 A | 11/1973 | Kamperman |
| 4,076,618 A | 2/1978 | Zeblisky |
| 4,144,149 A | 3/1979 | Bollhalder et al. |
| 4,260,493 A | 4/1981 | Kretas et al. |
| 4,362,629 A | 12/1982 | Senda et al. |
| 4,420,401 A | 12/1983 | Kretas et al. |
| 4,425,205 A | 1/1984 | Honma et al. |
| 4,428,773 A | 1/1984 | Krotz |
| 4,666,683 A | 5/1987 | Brown et al. |
| 4,675,111 A | 6/1987 | Newton et al. |
| 4,783,249 A | 11/1988 | Fishman |
| 4,956,097 A | 9/1990 | Courduvelis |
| 5,205,906 A | 4/1993 | Grutsch et al. |
| 5,282,934 A | 2/1994 | Cox |
| H1852 H | 6/2000 | Alexander et al. |

(Continued)

OTHER PUBLICATIONS

"Amine Borane Preface," Amine Borane Bulletin, BASF Corporation, Inroganics, www.basf.com/inorganics, pp. 1-20.

(Continued)

*Primary Examiner*—Matthew O Savage
(74) *Attorney, Agent, or Firm*—Patterson & Sheridan, LLP

(57) ABSTRACT

Embodiments herein provide waste abatement apparatuses and methods for treating waste solutions derived from depleted or used plating solutions, such as from an electroless deposition process or an electrochemical plating process. The waste abatement systems and processes may be used to treat the waste solutions by lowering the concentration of, if not completely removing, metal ions or reducing agents that are dissolved within the waste solution. In one embodiment of a demetallization process, a waste solution may be exposed to a heating element (e.g., copper coil) contained within an immersion tank. In another embodiment, the waste solution may be exposed to a catalyst having high surface area (e.g., steel wool or other metallic wool) within an immersion tank. In another embodiment, the waste solution may be flowed through a removable, catalytic conduit (e.g., copper tubing) having an internal catalytic surface.

12 Claims, 10 Drawing Sheets

U.S. PATENT DOCUMENTS

| | | | |
|---|---|---|---|
| 6,099,649 | A | 8/2000 | Schmitt et al. |
| 6,179,982 | B1 | 1/2001 | Ting et al. |
| 6,203,705 | B1 | 3/2001 | James et al. |
| 6,254,782 | B1 | 7/2001 | Kreisler |
| 6,270,679 | B1 | 8/2001 | Kreisler |
| 6,274,045 | B1 | 8/2001 | Kreisler |
| 6,402,806 | B1 | 6/2002 | Schmitt et al. |
| 6,528,409 | B1 | 3/2003 | Lopatin et al. |
| 6,680,540 | B2 | 1/2004 | Nakano et al. |
| 6,709,561 | B1 | 3/2004 | Pavlov et al. |
| 6,773,485 | B2 | 8/2004 | Doubrava et al. |
| 6,797,033 | B2 | 9/2004 | Doubrava et al. |
| 6,797,195 | B1 | 9/2004 | Kreisler |
| 6,800,111 | B2 | 10/2004 | Doubrava et al. |
| 7,048,857 | B2 | 5/2006 | Jangbarwala |
| 2004/0226407 | A1* | 11/2004 | Ericson .................. 75/711 |
| 2005/0095830 | A1 | 5/2005 | Weidman et al. |
| 2006/0138050 | A1 | 6/2006 | Jangbarwala |

OTHER PUBLICATIONS

"Basic and Fine Chemicals: Safety Data Sheet 004034/14," Bayer, Nov. 6, 2001, pp. 1-5.

"Degassing Valve For Continuous Automatic Venting," Plast-O-Matic Product Data, Catalog DGV—Prelim—2, Plast-O Matic Valves, Inc., Jul. 2005.

"Metals Liquid Abatement," Boc Edwards, http://www.bocedwards.com/liquid-abatement/metals-liquid-abatement.htm, Jul. 13, 2006, pp. 1-2.

"Series "ARV" Thermoplastic Air Release Valve," Plast-O-Matic Product Data, Catalog ARV, Plast-O Matic Valves, Inc., Sep. 2004.

"Wastewater Treatment," Boc Edwards, http://www.bocedwards.com/liquid-abatement/wastewater-treatment.cfm, Jul. 13, 2006.

Agarwala, et al. "Electroless alloy/composite coatings: A review," Sādhanā, vol. 28, Parts 3 & 4, Jun./Aug. 2003, pp. 475-493.

Broc "Managing Environmental Impact," By Alain Broc, Facilities Engineer of STMicroelectronics Rousset and Jerome Delay, Business Manager of Boc Edwards, As presented at SEMICON® Europa 2005.

Burke, et al. "Oxidation of some reducing agents used in electroless plating baths at gold anodes in aqueous media," Journal of Applied Electrochemistry, vol. 22, (1992), pp. 48-56.

Deepatana, et al. "Adsorption of Metals from Metal-Organic Complexes Derived from Bioleaching of Nickel Laterite Ores," 2004 ECI Conference on Separations Technology VI: New Perspectives on Very Large-Scale Operations, [2004], vol. RP3, Article 4, (2006), pp. 1-14.

Kim, et al. "Atomic Layer Deposition of Pd on TaN for Cu Electroless Plating," Journal of the Electrochemical Society, vol. 152, No. 6,(2005), pp. C376-C381.

Kim, et al. "Direct Copper Electroless Deposition on a Tungsten Barrier Layer for Ultralarge Scale Integration," Journal of the Electrochemical Society, vol. 152, No. 2, (2005), pp. C89-C95.

Nagle, et al. "Investigation of DMAB Oxidation at a Gold Microelectrode in Base," Electrochemical and Solid-State Letters, vol. 8, No. 5, (2005), pp. C77-C80.

Ohno, et al. "Anodic Oxidation of Reductants in Electroless Plating" J. Electrochem. Soc.: Electrochemical Science and Technology, vol. 132, No. 10 (1985), pp. 2323-2330.

Reed, et al. "Reduction of Organic Compounds with the Hydroxyborohydride Ion," J. Org. Chem., vol. 42, No. 24, (1977), pp. 3963-3965.

Sargent, et al. "Probing the Mechanism of Electroless Gold Plating Using an Electrochemical Quartz Crystal Microbalance," Journal of The Electrochemical Society, vol. 148, No. 4, (2001), pp. C257-C265.

Tsan, et al. "Case Report: The Clinical Toxicity of Dimethylamine Borane," Research/Environmental Medicine, Environmental Health Perspectives, vol. 113, No. 12, Dec. 2005, pp. 1784-1786.

* cited by examiner

METHOD FOR TREATMENT OF PLATING SOLUTIONS

BACKGROUND OF THE INVENTION

1. Field of the Invention

Embodiments of the invention generally relate to waste abatement apparatuses and methods for processing a waste solution after a plating process, and more specifically, a waste solution containing metal ions and reducing agents after an electroless deposition process or an electrochemical deposition process.

2. Description of the Related Art

The copper damascene process is widely established and has brought higher performance to semiconductor devices. Copper materials may be deposited by an electroless deposition (e-less) process or an electrochemical plating (ECP) process. Copper has replaced aluminum because of its lower resistivity and higher reliability. However, copper still suffers from electromigration and stress migration reliability issues as geometries continue to shrink, and current densities increase. Engineers have successfully solved these reliability problems by depositing a capping layer (e.g., cobalt tungsten phosphide (CoWP)) over the copper surface during a selective e-less process. A capping layer of CoWP deposited by an e-less process is self-aligned to copper and forms a smooth conformal film.

Generally, a chemical plating solution (e.g., e-less or ECP) contains a metal-containing compound, a reducing agent, a complexing/chelating agent, a pH adjusting agent, and other additives. A copper plating solution may contain copper sulfate as the metal-containing compound, glyoxylic acid as the reducing agent, ethylenediamine tetraacetic acid (EDTA) as the complexing/chelating agent, and tetramethylammonium hydroxide (TMAH) as the pH adjusting agent, and 2,2'-dipyridine or polyethylene glycol as an additive. A cobalt plating solution usually contains several metal-containing compounds, as well as several reducing agents. For example, an e-less plating solution for depositing CoWP usually contains a cobalt source, a tungsten source, a hypophosphite source, probably a boron-containing reducing agent, such as dimethylamine borane (DMAB). Although copper, cobalt, or tungsten-containing plating solutions are prevalent in the art, other metal-containing plating solutions are common for depositing nickel, platinum, palladium, molybdenum, tin, chromium, silver, gold, or alloys thereof.

Upon completion of a plating process, the used or depleted chemical plating solution is usually disposed of as a waste solution. Metal ion contaminants (e.g., cobalt, tungsten, nickel, or copper), reducing agents, and complexing/chelating agents are dissolved in the waste solution and pose a challenge for waste abatement processes.

Some references have proposed processes to reuse or regenerate depleted plating solutions by supplementing the depleted chemical components, such as metal salts or reducing agents. Several references have disclosed processes to reduce the concentration of copper ions or other metal ions from within used polishing solutions, such as CMP slurries. However, depleted polishing solutions generally do not contain reducing agents that are readily found in plating solutions, especially e-less solutions. The reducing agents contained within waste solutions need to be removed or destroyed during waste abatement processes. Often, waste solutions containing reducing agents are dangerous to handle due to hydrogen gas evolution formed by the reducing agents. The lower explosion limit (LEL) of hydrogen gas in the ambient air is about 3.8 molar percent (mol %).

Therefore, there is a need for a method and an apparatus to remove metal ions and reducing agents from waste solutions derived of depleted plating solutions while reducing processing complexity and improving safety, processing efficiency, and throughput during waste abatement.

SUMMARY OF THE INVENTION

Embodiments of the invention generally provide apparatuses and methods of a waste abatement system for treating aqueous waste solutions, such as depleted or used plating (e.g., e-less or ECP) solutions. The waste solutions are treated to reduce or remove the concentrations of dissolved metal ions, reducing agents, and other undesirable components within the solution. The process further provides treating the waste solutions while flushing from the waste abatement system any undesirable hydrogen gas that may evolve and accumulate therein.

In one embodiment, an apparatus for treating a waste solution containing metallic ions is provided which includes a reservoir having an inlet and an outlet, wherein the inlet is coupled with and in fluid communication with a process liquid source by a conduit system, an immersion tank coupled with and in fluid communication with the outlet of the reservoir by the conduit system, and a heating element disposed within the immersion tank, wherein the heating element contains a plating surface for forming metallic material thereon. A column system may be coupled with and in fluid communication with the immersion tank by the conduit system and an ionic exchange resin may be disposed within the column system.

The apparatus may further contain a flushing gas source coupled with and in fluid communication with the conduit system. The flushing gas source may contain nitrogen, argon, helium, or combinations thereof. The flushing gas may be used to purge an undesirable gas (e.g., hydrogen) from the abatement system. Also, the flushing gas may be used to maintain an overpressure while keeping ambient oxygen from breeching into the waste abatement system. The conduit system usually contains at least one degassing release valve, preferably, multiple degassing release valves (e.g., 3-5) throughout the system. In one example, the degassing release valves are configured to release hydrogen gas from the conduit system.

The apparatus may further contain a pH adjusting agent source coupled with and in fluid communication with the conduit system. In one example, the pH adjusting agent source is coupled with and in fluid communication with the conduit system and positioned between the immersion tank and the column system. The pH adjusting agent source may be configured to increase or decrease a pH value of the waste solution. In one example, the waste solution may be increased or decreased by a pH unit of about 1.0.

The plating surface of the heating element may contain a catalytic material, such as palladium, platinum, iron, nickel, chromium, stainless steel, steel, copper, cobalt, alloys thereof, or combinations thereof. The heating element may be controlled by a heater controller and is usually configured to be heated to a temperature within a range from about 25° C. to about 100° C.

The apparatus may further contain a water source coupled with and in fluid communication with the conduit system and/or a sediment trap coupled with and in fluid communication with the conduit system and positioned between the immersion tank and the column system. The water source may be used to dilute the waste solution. Also, the apparatus may further contain a metallic ion sensor positioned downstream from the column system. In one example, the process liquid source contains a waste solution that contains the metallic ions and at least one reducing agent.

In another embodiment, an apparatus for treating a waste solution containing metallic ions is provided which includes a reservoir comprising an inlet and an outlet, wherein the inlet is coupled with and in fluid communication with a process liquid source by a conduit system, an immersion tank coupled with and in fluid communication with the outlet of the reservoir by the conduit system, and an iron-containing metallic catalyst (e.g., steel wool) disposed within the immersion tank. The iron-containing metallic catalyst may contain a plating surface to form metallic material thereon. The apparatus may further contain a column system coupled with and in fluid communication with the immersion tank by the conduit system and an ionic exchange resin disposed within the column system.

Examples provide that the plating surface of the iron-containing metallic catalyst contains a catalytic material, such as palladium, platinum, iron, nickel, chromium, stainless steel, steel, copper, cobalt, alloys thereof, or combinations thereof. In several examples, the iron-containing metallic catalyst is a metallic wool, such as steel wool, or other high surface area catalyst. The steel wool may contain a coating of palladium, platinum, nickel, chromium, copper, cobalt, alloys thereof, or combinations thereof. Generally, the iron-containing metallic catalyst is configured to be heated to a temperature within a range from about 25° C. to about 100° C.

In another embodiment, an apparatus for treating a waste solution containing metallic ions is provided which includes a reservoir comprising an inlet and an outlet, wherein the inlet is coupled with and in fluid communication with a process liquid source, and a catalytic conduit system comprising a catalytic conduit coupled with and in fluid communication with the outlet of the reservoir. The catalytic conduit contains a plating surface for forming metallic material thereon. The apparatus may further contain a column system coupled with and in fluid communication with the catalytic conduit system and an ionic exchange resin disposed within the column system.

Examples provide that the catalytic conduit system may be configured to gradiently heat the catalytic conduit along the length of the catalytic conduit, such to substantially and evenly deposit a metallic film onto the plating surface of the catalytic conduit. In one example, the catalytic conduit system may contain a plurality of segmented removable catalytic conduits. The catalytic conduit may be a flexible tube that contains copper. The catalytic conduit may contain a catalytic material, such as palladium, platinum, iron, nickel, chromium, stainless steel, steel, copper, cobalt, alloys thereof, or combinations thereof. In one example, the catalytic material contains steel wool which may contain a coating of a material, such as palladium, platinum, nickel, chromium, copper, cobalt, alloys thereof, or combinations thereof. In another example, the catalytic conduit may contain an iron-containing metallic catalyst that may have a surface containing a catalytic material, such as palladium, platinum, iron, nickel, chromium, stainless steel, steel, copper, cobalt, alloys thereof, or combinations thereof.

In one embodiment, a method for removing metal ions from a waste solution is provided which includes flowing a waste solution into a conduit system from a reservoir, wherein the waste solution contains metal ions and at least one reducing agent, and the conduit system is substantially free of oxygen gas. The method further provides flowing the waste solution into an immersion tank coupled with the conduit system, exposing a heating element within the immersion tank to the waste solution to deposit a metallic film of the metal ions onto a surface of the heating element. Also, the method further provides degassing hydrogen gas from the waste solution through release valves positioned along the conduit system, and exposing the waste solution to an ionic exchange resin to further remove metal ions therefrom. The concentrations of the dissolved metal ion and the concentration of any reducing agents are greatly reduced within the waste solution.

Generally, the waste solution may be a plating solution or contain a plating solution, such as a chemical plating solution, which may contain metal ions, reducing agents, or both, as well as other components. The metal ions within the plating solution or waste solution generally include copper, cobalt, tungsten, nickel, platinum, palladium, molybdenum, tin, chromium, silver, gold, zinc, ruthenium, rhodium, rhenium, or combinations thereof. The reducing agents may include a phosphorous-containing reducing agent (e.g., hypophosphorous acid or hypophosphites), a boron-containing reducing agent (e.g., boranes, alkylamine boranes, dimethylamine borane, borohydrides), nitrogen-containing reducing agent (e.g., hydrazine, methylhydrazine, dimethylhydrazine, terbutylhydrazine, phenylhydrazine, or amines), complexes thereof, salts thereof, derivatives thereof, or combinations thereof. Other reducing agents include a reducing sugar agent or an organic reducing agent, such as glucose, glyoxylic acid monohydrate, formaldehyde, complexes thereof, salts thereof, derivatives thereof, or combinations thereof.

In other aspects, the method further provides flowing a flushing gas with the waste solution. The flushing gas helps maintain the conduit system substantially free of ambient oxygen from the air, as well as helps purge hydrogen gas that may have formed within portions of the waste abatement system. The flushing gas may contain nitrogen, argon, helium, or combinations thereof. In one example, the waste solution is maintained with an oxygen concentration of about 100 ppm or less, preferably about 10 ppm or less. In another example, release valves (e.g., degassing valves) are positioned throughout the conduit system and are adjusted to release the hydrogen gas when an internal pressure of the conduit system is above about 760 Torr. In another aspect, the method further provides flowing the undiluted waste solution directly from the process region to the reservoir. The waste water is more concentrated and easier to remove contaminants therefrom if the undiluted waste water is separate from any wash water generated during prior or subsequent steps (e.g., pre- or post-rinse).

During the waste abatement process, the pH concentration of the waste solution may be monitored prior to being exposed to the ionic exchange resin. The pH concentration may be adjusted by adding a pH adjustment solution to the waste solution prior to being exposed to the ionic exchange resin.

In another embodiment, a concentration of the metal ions within the waste solution is monitored after being exposed to the ionic exchange resin. In one example, the concentration of the metal ions is about 20 ppm or less, preferably about 1 ppm or less. Once the waste solution has been exposed to the ionic exchange resin, the waste solution may be transferred to an acid waste neutralization system for further treatment.

In another embodiment, a method for removing metal ions from a waste solution is provided which includes flowing a waste solution into a conduit system from a reservoir, wherein the waste solution contains metal ions and at least one reducing agent. The conduit system may be substantially free of oxygen gas or oxygen. The method further provides flowing the waste solution into an immersion tank coupled with the conduit system, exposing an iron-containing metallic catalyst within the immersion tank to the waste solution while depositing a metallic film of the metal ions onto a surface of the iron-containing metallic catalyst, degassing hydrogen gas from the waste solution through release valves positioned along the conduit system, and exposing the waste solution to an ionic exchange resin to further remove metal ions therefrom.

In another embodiment, a method for removing metal ions from a waste solution is provided which includes flowing a waste solution into a conduit system from a reservoir, wherein the waste solution contains metal ions and at least one reducing agent, and the conduit system is substantially free of oxygen gas. The method further provides flowing the waste solution through a removable conduit coupled to the conduit system, wherein the removable conduit is exposed to the waste solution while depositing a metallic film of the metal ions onto a surface of the removable conduit, degassing hydrogen gas from the waste solution through release valves positioned along the conduit system, and exposing the waste solution to an ionic exchange resin to further remove metal ions therefrom.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of the invention and are therefore not to be considered limiting of its scope, for the invention may admit to other equally effective embodiments.

DETAILED DESCRIPTION

Embodiments herein provide apparatuses and methods for treating waste solutions, such as depleted or used chemical plating solutions, generally used during an electroless deposition (e-less) process or an electrochemical plating (ECP) process. The waste abatement systems and processes may be used to treat the waste solutions by lowering the concentration of, if not completely removing, metal ions and/or reducing agents that are dissolved within the waste solution.

In one embodiment, a waste solution may be exposed to a heating element (e.g., copper coil) within an immersion tank during a demetallization process. In one example, the temperature of the heating element may be controlled during the demetallization process by a controller that is resistively coupled to the copper heating element.

In another embodiment, the waste solution may be exposed to an iron-containing metallic catalyst (e.g., steel wool) within an immersion tank during a demetallization process. In one example, the iron-containing metallic catalyst is contained within a basket positioned within the immersion tank. In another example, the temperature of the iron-containing metallic catalyst may be controlled during the demetallization process by a controller that is resistively coupled to the iron-containing metallic catalyst.

In another embodiment, the waste solution may be flowed through a removable conduit (e.g., copper tubing) during a demetallization process. The internal surface of the removable conduit contains a catalytic surface. In one example, the temperature of the removable conduit may be gradiently controlled during the demetallization process by heaters (e.g., heating tape) positioned along the removable conduit.

During the demetallization process, the metal ions and the reducing agents of the waste solution are consumed to form the metallic film on the surface of the heating element, the iron-containing metallic catalyst, or the removable conduit. Also, the heating element, the iron-containing metallic catalyst, or the removable conduit may be replaced with a fresh unit once the metallic film has formed a predetermined thickness. Subsequently, the waste solution may be exposed to an ion exchange resin to further remove trace amounts of metal ions therefrom. In one embodiment, the apparatus contains degassing valves positioned along the conduit system to provide degassing of any formed hydrogen gas ($H_2$) from the waste solution.

Figure 1:
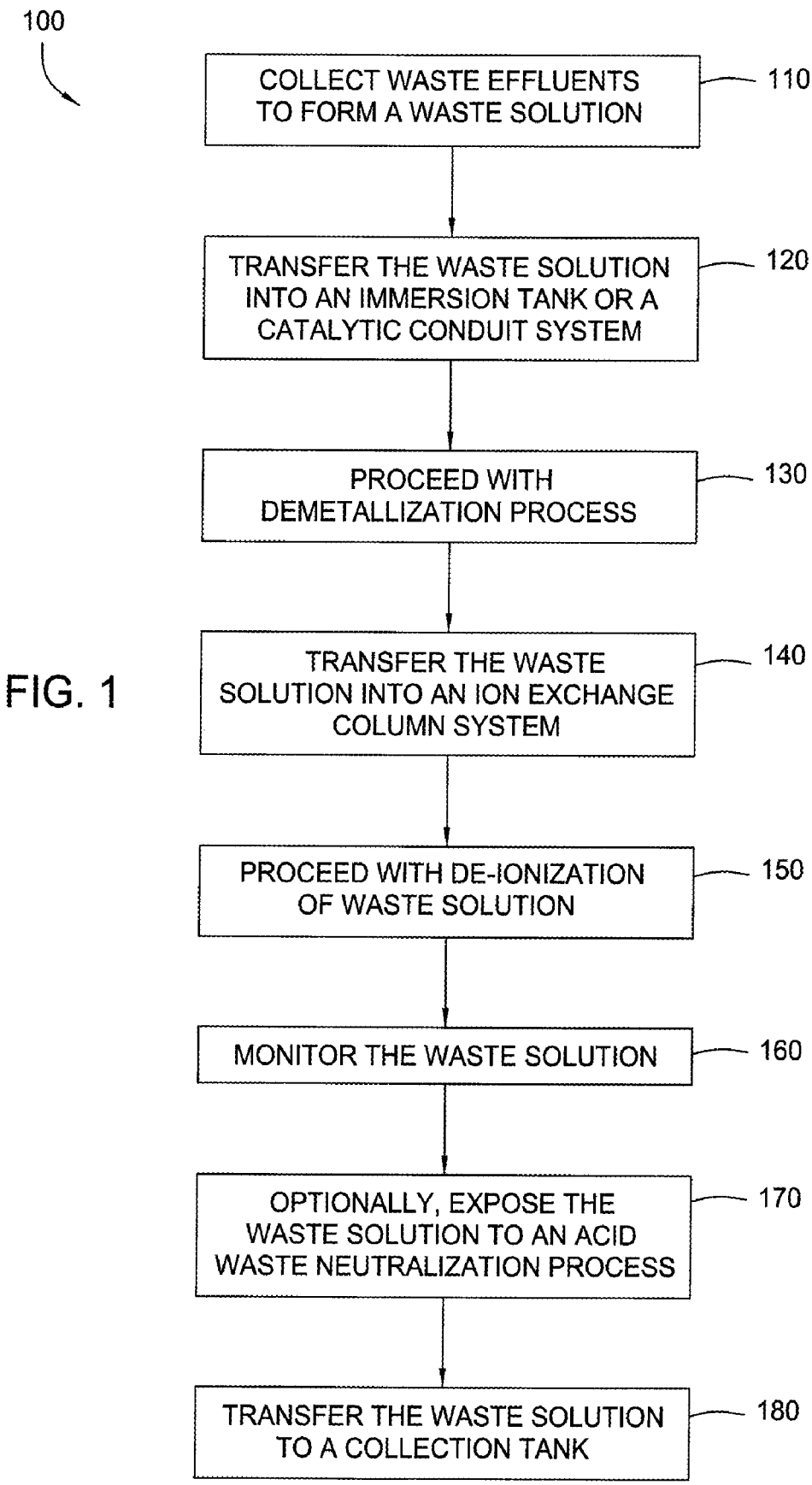
FIG. 1 depicts a flow chart of a waste abatement process as described by embodiments herein.

Embodiments provide that waste solutions may be treated during waste abatement process 100, schematically illustrated by the flow chart in FIG. 1. Process 100, containing steps 110-170, may be conducted on waste abatement systems 200, 300, 400, and 500, depicted in FIGS. 2, 3A, 4A, and 5A. During step 110 of waste abatement process 100, the waste effluents are transferred from various process areas and collected into a feed tank to form waste solution. The waste solution is transferred into an immersion tank or a catalytic conduit during step 120 wherein a demetallization process occurs during step 130. Subsequently, the waste solution is transferred into at least one de-ionization column during step 140 and exposed to a de-ionization process during step 150. Thereafter, the concentration of the waste solution is monitored for contaminants, such as metal ions or reducing agents during step 160. At step 170, the waste solution may be optionally exposed to an acid waste neutralization (AWN) process before being transferred to a collection tank during step 180. The waste solution may be diluted, heated, or have the pH adjusted during steps 110, 120, 130, 140, 150, and 170.

Figure 2:
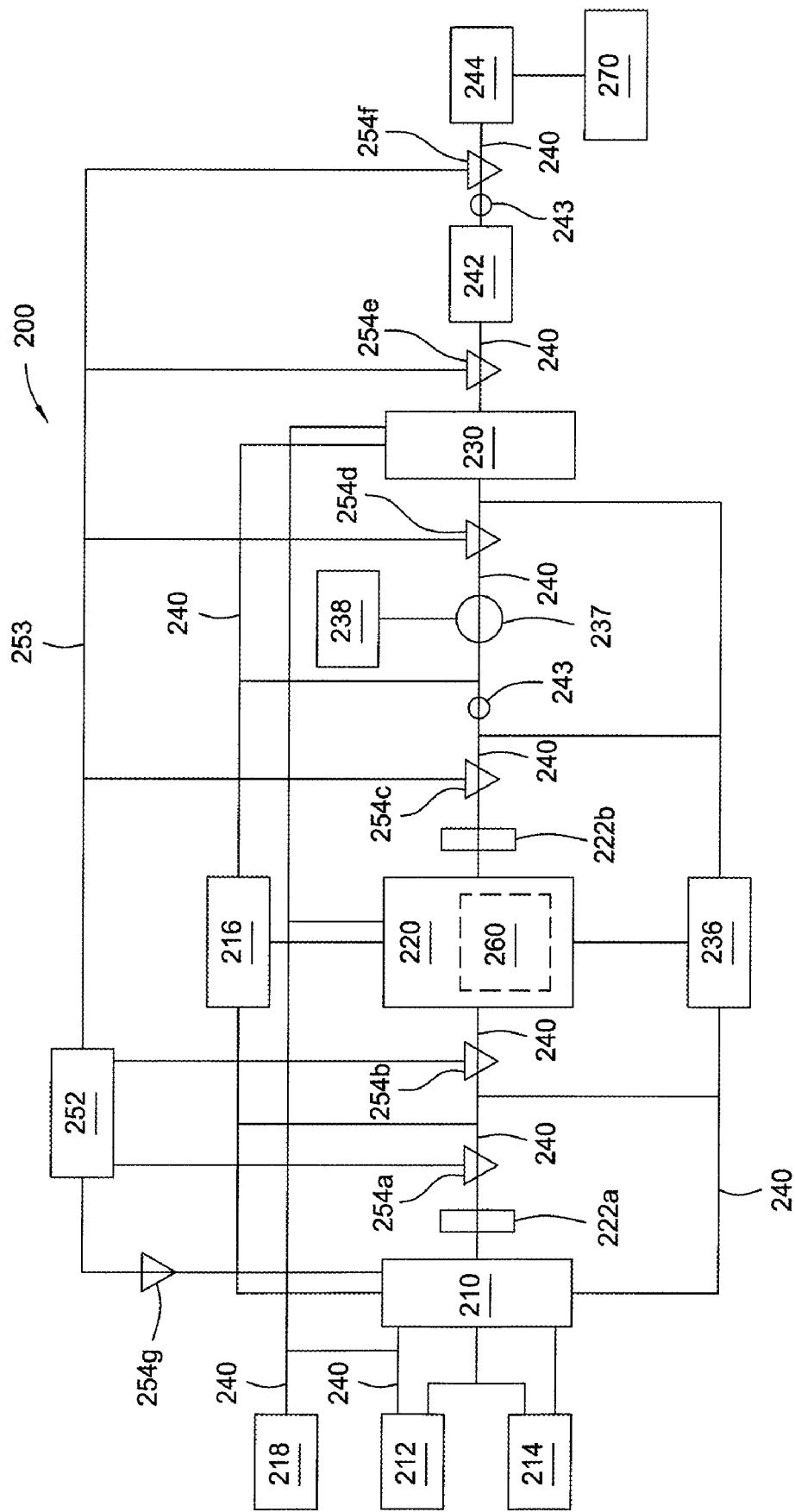
FIG. 2 depicts a schematic illustration of a waste abatement system as described by embodiments herein.

In one embodiment, waste abatement system 200, depicted in FIG. 2, contains feed tank 210, immersion tank 220 and/or catalyst 260, and column system 230. Conduit system 240 is in fluid communication and connects with at least feed tank 210, immersion tank 220 and/or catalyst 260, and column system 230. Feed tank 210 may be fed from process liquid source 212, process by-pass source 214, or both through conduit system 240.

In one example, the waste solution contains depleted plating solution from an e-less process and a rinse process. The SLIMCELL™ platform, available from Applied Materials, Inc., located in Santa Clara, Calif., for example, includes an integrated processing chamber capable of depositing a conductive material by an electroless process, such as an e-less cell, which is available from Applied Materials, Inc. The SLIMCELL™ platform may include one or more e-less cells as well as one or more pre-deposition or post-deposition cell, such as spin-rinse-dry (SRD) cells or annealing chambers. In one example, feed tank 210 may be fed from process liquid source 212, such as an e-less cell, and process by-pass source 214, such as an SRD cell.

Water source 216 is connected conduit system 240 and may be used to supply water (e.g., deionized water) to feed tank 210, as well as to immersion tank 220 and a variety of places along conduit system 240, such as between feed tank 210 and immersion tank 220 or between and immersion tank 220 and column system 230. Water source 216 may be a water tank or other vessel for containing water. Alternatively, water source 216 may be a hose, a pipe, or other feed line that supplies water to waste abatement system 200. Water, from water source 216, may be used during a waste abatement process, but is usually used to rinse waste abatement system 200 during a cleaning process after finishing the waste abatement process.

FIG. 2 further depicts pH adjusting device 236 connected to and in fluid communication with conduit system 240 and may be used to adjust the pH of the waste solution throughout waste abatement system 200. The pH adjusting device 236 may be coupled upstream or downstream from immersion tank 220 or catalyst 260 and may be used to increase or decrease the pH of the waste solution. In one embodiment, an in situ pH probe or sensor may be placed within waste abatement system 200. Alternative, aliquot samples of the waste solution may be removed at various points (e.g., outlets 243) along conduit system 240 and the pH value of the waste solution may be determined by an external pH meter or other means.

In one example, pH adjusting device 236 is configured to combine a basic pH adjusting agent with the waste solution at a concentration to increase the pH value of the waste solution by a pH unit of about 1.0 upstream from immersion tank 220 or catalyst 260. In another example, pH adjusting device 236 is configured to increase the pH value of the waste solution by a pH unit of about 1.0 downstream from upstream from immersion tank 220 or catalyst 260. The basic pH adjusting agent may contain an aqueous solution, an organic solution, or a mixture thereof and include alkaline or rare earth hydroxides and ammonium or alkylammonium hydroxides. Examples of basic pH adjusting agents include sodium hydroxide, potassium hydroxide, lithium hydroxide, calcium hydroxide, ammonium hydroxide, tetramethylammonium hydroxide, tetraethylammonium hydroxide, tetramethoxyammonium hydroxide, trimethoxyammonium hydroxide, dimethoxyammonium hydroxide, methoxyammonium hydroxide, tetraethoxyammonium hydroxide, triethoxyammonium hydroxide, diethoxyammonium hydroxide, ethoxyammonium hydroxide, derivatives thereof, and combinations thereof.

In one example, pH adjusting device 236 is configured to combine an acidic pH adjusting agent with the waste solution at a concentration to decrease the pH value of the waste solution by a pH unit of about 1.0 upstream from immersion tank 220 or catalyst 260. In another example, pH adjusting device 236 is configured to decrease the pH value of the waste solution by a pH unit of about 1.0 downstream from upstream from immersion tank 220 or catalyst 260. The acidic pH adjusting agent usually contains an aqueous solution. Examples of acidic pH adjusting agents include hydrochloric acid, sulfuric acid, hypophosphoric acid, hydrofluoric acid, nitric acid, citric acid, derivatives thereof, and combinations thereof.

Gas supply 218 is connected to conduit system 240 and supplies a flushing gas or purge gas throughout waste abatement system 200. Gas supply 218 may be in fluid communication and connected to feed tank 210, immersion tank 220, column system 230, and a variety of places along conduit system 240. A flushing gas, such as an inert gas (e.g., nitrogen, argon, helium, or combinations thereof) may be supplied throughout waste abatement system 200 from gas supply 218. Degassing valves 254a-254g may be used to release or vent specified gases from waste abatement system 200. In one example, degassing valves 254a-254g may be adjusted to release undesirable gases (e.g., hydrogen gas) from conduit system 240 at a predetermined pressure, such as when an internal pressure of conduit system 240 is at or above about 760 Torr. Generally, degassing valves 254a-254g may vent to the outside of waste abatement system 200 where the undesirable gas is drawn into ventilation system 252 through exhaust lines 253. Valves that may be used as degassing valves 254a-254g include CKM Self-Closing Valve available from Plast-O-Matic Valves, Inc., located in Cedar Grove, N.J.

The flushing gas may be flowed through waste abatement system 200 to prevent or minimize a build-up of hydrogen gas or other undesirable gases within waste abatement system 200. In one example, the flushing gas purges any evolved hydrogen gas out of waste abatement system 200 to form an exhaust gas. The exhaust gas may be maintained with a hydrogen concentration of about 5 molar percent (mol %) or less, preferably, about 3.8 mol % or less, more preferably, about 1 mol % or less, and more preferably, about 0.5 mol % or less. The flushing gas may be used to pressurize waste abatement system 200 or any portion thereof (e.g., feed tank 210, immersion tank 220, column system 230, and conduit system 240). The over-pressure formed by the flushing gas advantageously reduces or eliminates the diffusion of oxygen gas into waste abatement system 200. Therefore, the waste solution may be maintained with a lower oxygen concentration than if exposed to the ambient air. For example, the waste solution may be maintained with an oxygen concentration of about 100 ppm or less, preferably, about 10 ppm or less, and more preferably, about 1 ppm or less.

In one embodiment, waste abatement system 200 has automatic controls with fail safes, as well as other safety features that may be used during waste abatement process 100. For example, if the internal pressure of waste abatement system 200 exceeds a predetermined pressure (e.g., over 760 Torr), the controller will automatically stop process 100. Waste effluents coming from process liquid source 212 and process by-pass source 214 may be completely stopped or have a reduced flow rate in order to stop process 100. In another example of a safety feature, if the flow of flushing or purge gas within waste abatement system 200 ceases, the controller will automatically stop process 100.

During step 110, the waste effluents from process liquid source 212 and/or process by-pass source 214 may be collected within feed tank 210 to form a waste solution. In one example, process liquid source 212 contains a depleted plating solution left over after a deposition process, such as an electroless deposition process or an electrochemical plating process. Generally, the waste solution may be a plating solution or contain a plating solution, such as a chemical plating solution, which may contain metal ions, reducing agents, or both, as well as other components. The metal ions may include copper, cobalt, tungsten, nickel, platinum, palladium, molybdenum, tin, chromium, silver, gold, zinc, ruthenium, rhodium, rhenium, alloys thereof, or combinations thereof. The reducing agents may include a phosphorous-containing reducing agent (e.g., hypophosphorous acid or hypophosphites), a boron-containing reducing agent (e.g., boranes, alkylamine boranes, dimethylamine borane, borohydrides), nitrogen-containing reducing agent (e.g., hydrazine, methylhydrazine, dimethylhydrazine, terbutylhydrazine, phenylhydrazine, or amines), complexes thereof, salts thereof, derivatives thereof, or combinations thereof. Other reducing agents include a reducing sugar agent or an organic reducing agent, such as glucose, glyoxylic acid monohydrate, formaldehyde, complexes thereof, salts thereof, derivatives thereof, or combinations thereof.

Feed tank 210 may contain immersion heaters to heat the waste solution to a predetermined temperature. Alternatively, the waste solution may be externally heated within feed tank 210, by a heating mantle or heating tape. Other treatments include adjusting the pH value of the waste solution by adding an acidic solution or basic solution by pH adjusting device 236 during step 110.

The waste solution may be exposed to an optional treatment during step 120 while being flowed from feed tank 210, through conduit system 240 to either immersion tank 220 or catalyst 260. The optional treatment may include increasing the temperature of waste solution, diluting the waste solution by adding water, or adjusting the pH value of the waste solution. In-line heater 222a may be used to heat the waste solution while flowing through conduit system 240. In one example, the waste solution may be heated to or maintained at a temperature within a range from about 20° C. to about 120° C., preferably, from about 25° C. to about 100° C., and more preferably, from about 50° C. to about 80° C. Other treatments include adjusting the pH value of the waste solution by adding an acidic solution or a basic solution by pH adjusting device 236. In one example, the waste solution may be adjusted to have a pH value within a range from about 4 to about 12, preferably, from about 4.5 to about 10, and more preferably, from about 4 to about 9.

During step 130, the waste solution is exposed to catalyst 260 during a demetallization process. In one embodiment, the waste solution may be exposed to catalyst 260, such as metallic wool or a heating element contained within immersion tank 220. In another embodiment, the waste solution is transferred directly into catalyst 260, such as a catalytic conduit, during step 120. Catalyst 260 is usually a high surface area catalyst and is used during the demetallization process of the waste solution.

In one embodiment, catalyst 260 is an iron-containing metallic catalyst having a plating surface for to form metallic material deposited from metal ions of the waste solution. The plating surface of the iron-containing metallic catalyst usually contains a catalytic material, such as palladium, platinum, iron, nickel, chromium, stainless steel, steel, copper, cobalt, alloys thereof, or combinations thereof. In one example, the catalytic material is steel wool. The steel wool may be continuously or discontinuously coated by another catalytic material, such as palladium, platinum, nickel, chromium, copper, cobalt, alloys thereof, or combinations thereof. Generally, the iron-containing metallic catalyst is configured to be heated to a temperature within a range from about 25° C. to about 100° C. In one example, catalyst 260 is a bundle of steel wool that has been pretreated to expose a surface of steel or iron. In another example, catalyst 260 is a bundle of steel wool that has been continuously or discontinuously coated with metallic cobalt or copper. In other examples, the steel wool has been continuously or discontinuously coated with metallic platinum or palladium.

In another embodiment, catalyst 260 is a removable heating element having a plating surface for forming metallic material deposited from metal ions of the waste solution. The heating element may be composed completely of a catalytic material or may be continuously or discontinuously coated by a catalytic material, such as palladium, platinum, iron, nickel, chromium, stainless steel, steel, copper, cobalt, alloys thereof, or combinations thereof. The heating element is usually configured to be heated to a temperature within a range from about 25° C. to about 100° C. In one example, the temperature of the heating element may be controlled during the demetallization process (step 130) by a controller that is resistively coupled to the copper heating element.

In another embodiment, catalyst 260 is a catalytic conduit system containing a removable, catalytic conduit having an internal catalytic surface for forming metallic material deposited from metal ions of the waste solution. The catalytic conduit is coupled with and in fluid communication with the outlet of feed tank 210. Examples provide that the catalytic conduit system may be configured to gradiently heat the catalytic conduit along the length of the conduit, such to substantially evenly depositing a metallic film onto the plating surface of the conduit. In one example, the catalytic conduit system may contain a plurality of segmented removable conduits. Each of the removable conduits may be equipped with at least one valve and also contain connectors, such as quick connect/disconnect, on each end. Therefore, the removable conduits may be placed in series or parallel within system 200. The catalytic conduit may be a flexible tube and contains copper. The catalytic conduit may contain an internal surface of a catalytic material, such as palladium, platinum, iron, nickel, chromium, stainless steel, steel, copper, cobalt, alloys thereof, or combinations thereof. In one example, the catalytic material contains steel wool which may contain a coating of a material, such as palladium, platinum, nickel, chromium, copper, cobalt, alloys thereof, or combinations thereof. In another example, the conduit may contain an iron-containing metallic catalyst that may have a surface containing a catalytic material, such as palladium, platinum, iron, nickel, chromium, stainless steel, steel, copper, cobalt, alloys thereof, or combinations thereof.

The waste solution may be exposed to an optional treatment during step 140 while being flowed from either immersion tank 220 or catalyst 260, through conduit system 240 to column system 230. The optional treatment may include adjusting the temperature of waste solution, diluting the waste solution by adding water, or adjusting the pH value of the waste solution. In-line heater 222b may be used to heat the waste solution while flowing through conduit system 240. Alternative, cooling system 238 with heat exchange 237 may be used to cool the waste solution while flowing through conduit system 240. In one example, the waste solution may be heated to, cooled to, or maintained at a temperature within a range from about 20° C. to about 120° C., preferably, from about 25° C. to about 100° C., and more preferably, from about 50° C. to about 80° C. Other treatments include adjusting the pH value of the waste solution by adding an acidic solution or a basic solution by pH adjusting device 236. In one example, the waste solution may be adjusted to have a pH value within a range from about 4 to about 12, preferably, from about 4.5 to about 10, and more preferably, from about 4 to about 9.

During step 150, the waste solution is flowed through column system 230 during a de-ionization process. Metallic ions are removed from the waste solution while being exposed to an ion-exchange resin within column system 230. The metallic ions that may be removed from the waste solution include copper, cobalt, tungsten, molybdenum, tin, chromium, nickel, platinum, palladium, silver, gold, and combinations thereof. Column system 230 may contain one ion-exchange bed or two, three, or more ion-exchange beds that are connected in parallel or series with each other. In one example, waste abatement system 200 contains two, three, or more column systems 230. A by-pass line (not shown) may be positioned between two or more column systems 230 or ion-exchange beds. In one example, the by-pass line may be used to direct the waste solution to an ion-exchange bed while replacing or servicing a second ion-exchange bed. In another example, waste abatement system 200 may use detector 242 to determine when the ion-exchange bed has such low efficiency that the by-pass line may automatically be switched to for directing the waste solution from the less efficient ion-exchange bed to a second ion-exchange bed. In an alternative embodiment, the waste solution is by-passed column system 230 and was flowed to acid waste neutralization system 244 or collection tank 270.

Column system 230 contains at least one bed of an ion exchange resin which may include iminodiacetic resins, amidoxime resins, amino-phosphonic resins, bis-picolylamine resins, derivatives thereof, or combinations thereof. In one embodiment, the ion-exchange resin is in proton form or acidic form, versus a salt form, such as sodium form. Ion exchange resins are available from Purolite Company, located in Bala Cynwyd, Pa. Examples include AMBERLITE™ IRC748 for metal removal (e.g., Co or Cu) and AMBER-LITE™ IRA743 for boron removal, both available from Rohm and Haas, located in Philadelphia, Pa.

After the de-ionization process at step 150, the concentration of metal ions, reducing agents, hydrogen gas, or other components of the treated waste solution may be monitored or determined during step 160. The treated waste solution exiting column system 230 is transferred through conduit system 240, pass detector 242 (step 160), and flowed to acid waste neutralization system 244 (step 170) or collection tank 270 (step 180). If a predetermined concentration of a waste solution component (e.g., metal ion concentration) has not been met, then the treated waste solution may be recirculated or looped through column system 230. In one embodiment, detector 242 may be used to determine the concentration of metal ions, reducing agents, or hydrogen gas within the treated waste solution.

In one embodiment, the treated waste solution may be monitored or determined during step 160 to have a metal ion concentration of about 5 ppm or less, preferably, about 1 ppm or less, more preferably, about 0.1 ppm or less, and more preferably, about 10 ppb or less at step 160. The metal ions include copper, cobalt, tungsten, nickel, platinum, palladium, molybdenum, chromium, silver, gold, zinc, ruthenium, rhodium, rhenium, and combinations thereof. In one example, the treated waste solution contains a copper concentration of about 1 ppm or less, preferably, about 0.1 ppm or less, and more preferably, about 10 ppb or less. In another example, the treated waste solution contains a cobalt concentration of about 1 ppm or less, preferably, about 0.1 ppm or less, and more preferably, about 10 ppb or less.

Also, the treated waste solution may be monitored or determined during step 160 to have a reducing agent concentration of about 5 ppm or less, preferably, about 1 ppm or less, more preferably, about 0.1 ppm or less, and more preferably, about 10 ppb or less during step 160. In one example, the treated waste solution contains a DMAB concentration of about 1 ppm or less, preferably, about 0.1 ppm or less, and more preferably, about 10 ppb or less. In another example, the treated waste solution contains a hypophosphite concentration of about 1 ppm or less, preferably, about 0.1 ppm or less, and more preferably, about 10 ppb or less.

In one embodiment, detector 242 is a spectroscopic detector coupled with conduit system 240 and used to perform in situ spectroscopic analysis of waste solution downstream from column system 230 during step 160. For example, conduit system 240 may be attached in fluid communication with detector 242 so that waste solution passes through detector 242. In another example, detector 242 may be coupled outside of conduit system 240 over a window (not shown) positioned on conduit system 240. Detector 242 may be networked with the control system and remotely monitored by an operator. Detector 242 may be an UV-vis spectrometer, an IR or FT-IR spectrometer, a Raman spectrometer, or derivatives thereof. Spectrometers that may be used as detector 242 for UV-vis, IR, or FT-IR spectroscopy are available from Thermo Electron Corporation. Spectrometers that may be used as detector 242 for Raman spectroscopy are available from Thermo Electron Corporation and Kaiser Optical Systems.

In another embodiment, outlet 243 may be used to remove an aliquot sample of waste solution downstream from column system 230 during step 160. Subsequently, the aliquot sample may be analyzed to determine the concentration of metal ions, reducing agents, hydrogen gas, or other components of the waste solution. In one example, the aliquot sample may be analyzed by an inductively-coupled plasma (ICP) analysis process. In another example, the aliquot sample may be analyzed by an iodometric titration technique. Other examples for analyzing aliquot samples of the waste solution include UV-vis, FT-IR, or Raman spectroscopic processes.

Figure 3A:
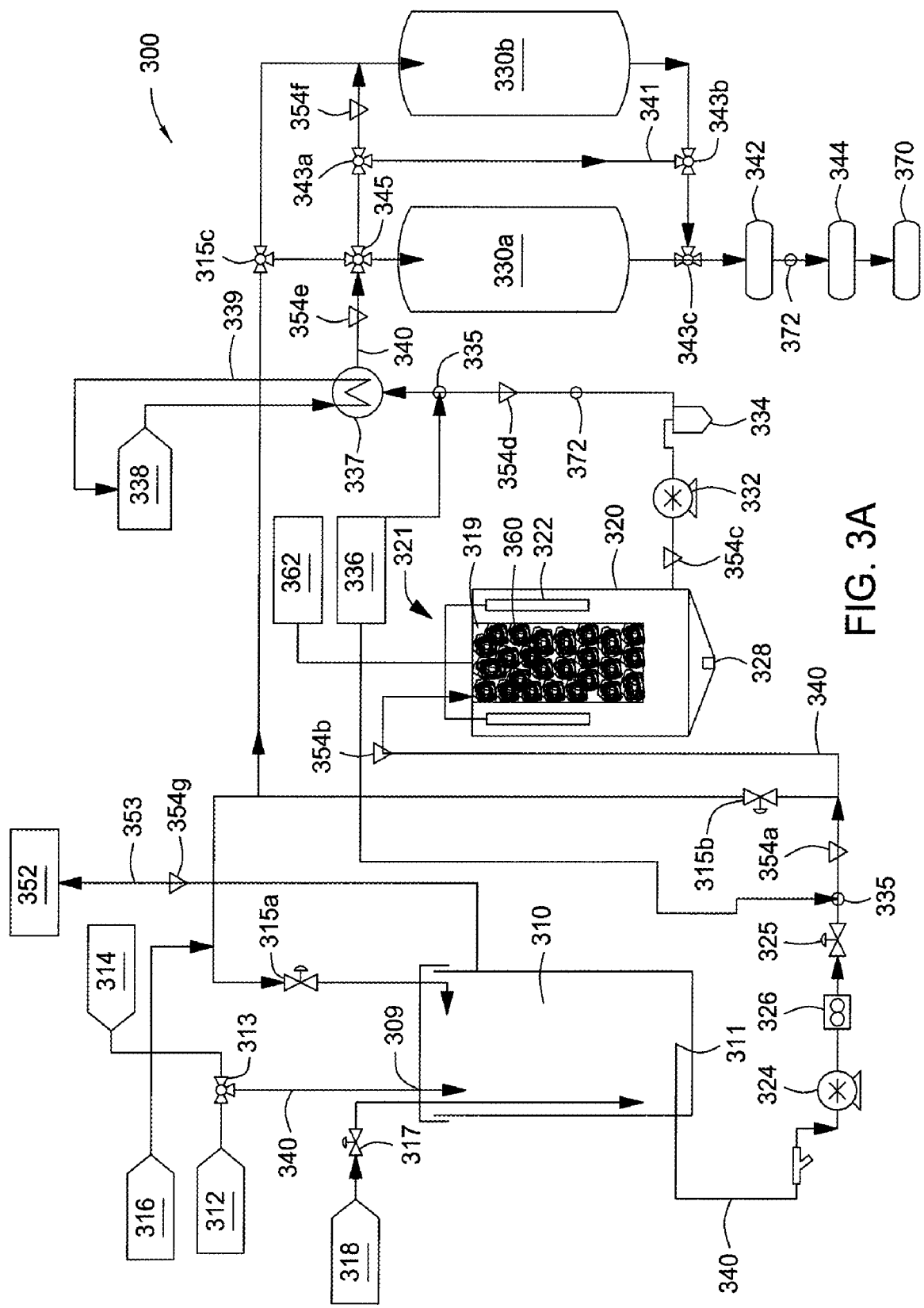
FIG. 3A depicts a schematic illustration of another waste abatement system as described by embodiments herein.
Figure 3B:
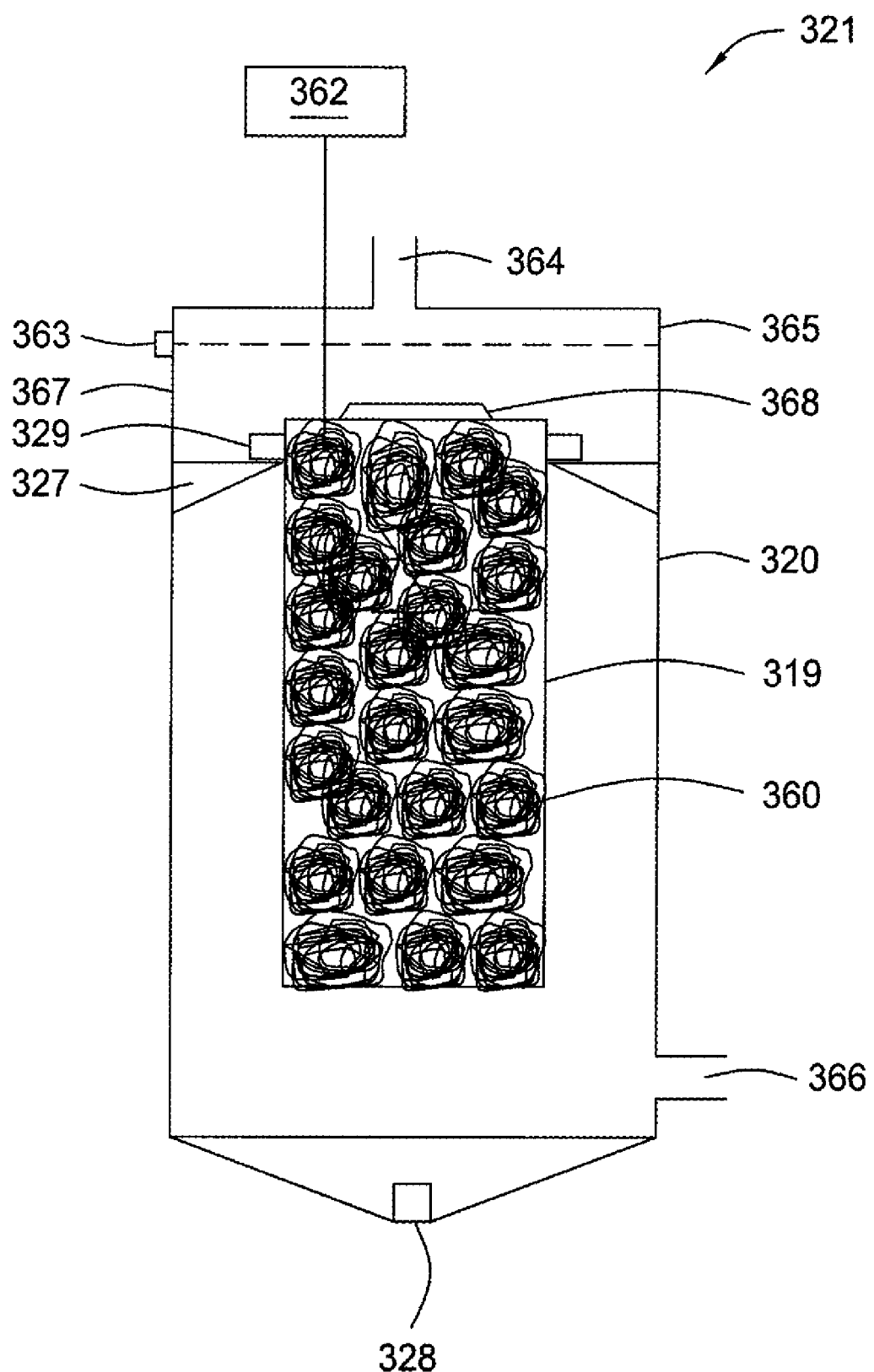
FIGS. 3B-3C depict schematic illustrations of catalytic systems used in waste abatement system as described by embodiments herein.
Figure 3C:
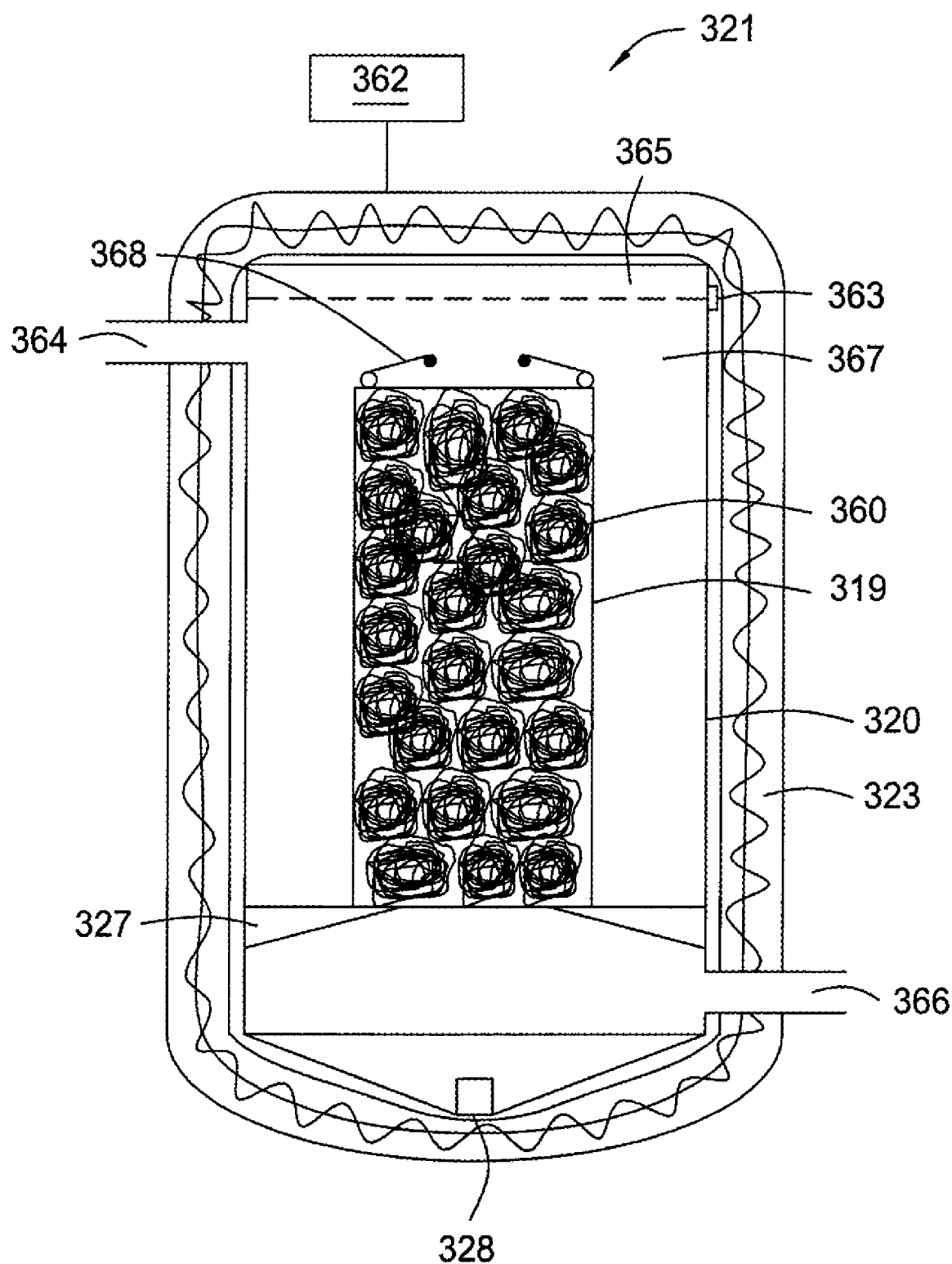

In another embodiment, process 100 may be conducted with waste abatement system 300 containing catalyst 360 (e.g., metallic wool), as depicted in FIGS. 3A-3C. Catalyst 360 may be easily removed from waste abatement system 300 for recycling and recovery of the plated metallic waste. Subsequently, catalyst 360 may be disposed of or reused within waste abatement system 300. Waste abatement system 300 contains feed tank 310, immersion tank 320, and column systems 330a and 330b. Conduit system 340 connects at least feed tank 310, immersion tank 320, and column systems 330a and 330b. In one example, a waste solution may be collected in feed tank 310, exposed to catalyst 360 within immersion tank 320, passed through column systems 330a and 330b, and flowed to acid waste neutralization system 344 or collection tank 370 for final disposal.

Feed tank 310 may be fed from process liquid source 312, process by-pass source 314, or both, also connected to and in fluid communication with conduit system 340. Feed tank 310 contains at least one inlet 309 for receiving depleted solutions, wash solutions, and other waste solutions and at least one outlet 311 for distributing the combined waste solution. In one example, process liquid source 312 contains a depleted plating solution remaining after a deposition process, such as an e-less process or an ECP process. Process liquid source 312 and process by-pass source 314 may be connected to conduit system 340 by three-way valve 313 or by independent single valves (not shown).

Water source 316 is to connected conduit system 340 and may be used to supply water (e.g., deionized water) throughout waste abatement system 300, such as to feed tank 310, as well as to immersion tank 320 and a variety of places along conduit system 340, such as between feed tank 310 and immersion tank 320 or between and immersion tank 320 and column systems 330a and 330b. Water source 316 may be a water tank or other vessel for containing water. Alternatively, water source 316 may be a hose, a pipe, or other feed line that supplies water to waste abatement system 300. Water, from water source 316, may be used during a waste abatement process, but is usually used to rinse waste abatement system 300 during a cleaning process after finishing the waste abatement process.

Valves 315a, 315b, and 315c may be used to control the flow of water from water source 316 to specific regions of waste abatement system 300. For example, valve 315a may be used for controlling the flow of water to feed tank 310, valve 315b may be used for controlling the flow of water upstream of immersion tank 320, valve 315c may be used for controlling the flow of water upstream of column systems 330a and 330b.

FIG. 3A further depicts pH adjusting device 336 connected to and in fluid communication with conduit system 340 and may be used to adjust the pH of the waste solution throughout waste abatement system 300. The pH adjusting device 336 may be coupled upstream or downstream from immersion tank 320 or catalytic system 321 and may be used to increase or decrease the pH of the waste solution. In one embodiment, an in situ pH probe or sensor, such as probe 335 may be placed upstream or downstream from immersion tank 320. Alternative, aliquot samples of the waste solution may be removed at various points along conduit system 340 and the pH value of the waste solution may be determined by an external pH meter or other means.

In one example, pH adjusting device 336 is configured to combine a basic pH adjusting agent with the waste solution at a concentration to increase the pH value of the waste solution by a pH unit of about 1.0 upstream from immersion tank 320 or catalytic system 321. In another example, pH adjusting device 336 is configured to increase the pH value of the waste solution by a pH unit of about 1.0 downstream from upstream from immersion tank 320 or catalytic system 321. The basic pH adjusting agent may contain an aqueous solution, an organic solution, or a mixture thereof and include alkaline or rare earth hydroxides and ammonium or alkylammonium hydroxides. Examples of basic pH adjusting agents include sodium hydroxide, potassium hydroxide, lithium hydroxide, calcium hydroxide, ammonium hydroxide, tetramethylammonium hydroxide, tetraethylammonium hydroxide, tetramethoxyammonium hydroxide, trimethoxyammonium hydroxide, dimethoxyammonium hydroxide, methoxyammonium hydroxide, tetraethoxyammonium hydroxide, triethoxyammonium hydroxide, diethoxyammonium hydroxide, ethoxyammonium hydroxide, derivatives thereof, and combinations thereof.

In one example, pH adjusting device 336 is configured to combine an acidic pH adjusting agent with the waste solution at a concentration to decrease the pH value of the waste solution by a pH unit of about 1.0 upstream from immersion tank 320 or catalytic system 321. In another example, pH adjusting device 336 is configured to decrease the pH value of the waste solution by a pH unit of about 1.0 downstream from upstream from immersion tank 320 or catalytic system 321. The acidic pH adjusting agent usually contains an aqueous solution. Examples of acidic pH adjusting agents include hydrochloric acid, sulfuric acid, hypophosphoric acid, hydrofluoric acid, nitric acid, citric acid, derivatives thereof, and combinations thereof.

At least one gas supply 318 may be connected to and in fluid communication with conduit system 340 for supplying a gas throughout waste abatement system 300. A flushing gas, such as an inert gas (e.g., nitrogen, argon, helium, or combinations thereof) may be supplied to feed tank 310 or waste abatement system 300 from gas supply 318. The flushing gas may be used to pressurize waste abatement system 300 or any portion thereof (e.g., feed tank 310, immersion tank 320, column systems 330a and 330b, and conduit system 340). Valve 317 may be used to control the gas flow from gas supply 318 to feed tank 310 or waste abatement system 300.

Degassing valves 354a-354g may be used to release or vent specified gases from waste abatement system 300. In one example, degassing valves 354a-354g may be adjusted to release undesirable gases (e.g., hydrogen gas) from conduit system 340 at a predetermined pressure, such as when an internal pressure of conduit system 340 is at or above about 760 Torr. Degassing exhaust valves may be positioned throughout waste abatement system 300 in various quantities, within a similar region, or between common stations. Degassing valve 354a may be positioned between feed tank 310 and immersion tank 320 or between feed tank 310 and catalytic system 321. Degassing valve 354b may also be positioned between feed tank 310 and immersion tank 320 or between feed tank 310 and catalytic system 321. Alternatively, degassing valve 354b may be included within catalytic system 321. Degassing valves 354c, 354d, 354e, and 354f may be positioned along conduit system 340 and between immersion tank 320 and column systems 330a and 330b. Degassing valve 354g may be positioned along exhaust line 353 and between feed tank 310 and ventilation system 352.

Generally, degassing valves 354a-354g may vent to the outside of waste abatement system 300 where the undesirable gas is drawn into ventilation system 352 through exhaust line 353. Although not depicted, degassing valves 354a-354f may each be independently coupled to and in fluid communication with ventilation system 352 through exhaust line 353, similar to degassing valves 254a-254g coupled to and in fluid communication with ventilation system 252 through exhaust line 253, as depicted in FIG. 2. Valves that may be used as degassing valves 354a-354g include CKM Self-Closing Valve available from Plast-O-Matic Valves, Inc., located in Cedar Grove, N.J.

The flushing gas may be flowed through waste abatement system 300 to prevent or minimize a build-up of hydrogen gas or other undesirable gases within waste abatement system 300. In one example, the flushing gas purges any evolved hydrogen gas out of waste abatement system 300 to form an exhaust gas. The exhaust gas may be maintained with a hydrogen concentration of about 5 mol % or less, preferably, about 3.8 mol % or less, more preferably, about 1 mol % or less, and more preferably, about 0.5 mol % or less. The flushing gas may be used to pressurize waste abatement system 300 or any portion thereof (e.g., feed tank 310, immersion tank 320, column systems 330a and 330b, and conduit system 340). The over-pressure formed by the flushing gas advantageously reduces or eliminates the diffusion of oxygen gas into waste abatement system 300. Therefore, the waste solution may be maintained with a lower oxygen concentration than if exposed to the ambient air. For example, the waste solution may be maintained with an oxygen concentration of about 100 ppm or less, preferably, about 10 ppm or less, and more preferably, about 1 ppm or less.

In one embodiment, waste abatement system 300 has automatic controls with fail safes, as well as other safety features that may be used during waste abatement process 100. For example, if the internal pressure of waste abatement system 300 exceeds a predetermined pressure (e.g., over 760 Torr), the controller will automatically stop process 100. Waste effluents coming from process liquid source 312 and process by-pass source 314 may be completely stopped or have a reduced flow rate in order to stop process 100. In another example of a safety feature, if the flow of flushing or purge gas within waste abatement system 300 ceases, the controller will automatically stop process 100.

During step 110, the waste effluents from process liquid source 312 and/or process by-pass source 314 may be collected within feed tank 310 to form a waste solution. In one example, process liquid source 312 contains a depleted plating solution left over after a deposition process, such as an electroless deposition process or an electrochemical plating process. Generally, the waste solution may be a plating solution or contain a plating solution, such as a chemical plating solution, which may contain metal ions, reducing agents, or both, as well as other components. The metal ions may include copper, cobalt, tungsten, nickel, platinum, palladium, molybdenum, tin, chromium, silver, gold, zinc, ruthenium, rhodium, rhenium, alloys thereof, or combinations thereof. The reducing agents may include a phosphorous-containing reducing agent (e.g., hypophosphorous acid or hypophosphites), a boron-containing reducing agent (e.g., boranes, alkylamine boranes, dimethylamine borane, borohydrides), nitrogen-containing reducing agent (e.g., hydrazine, methylhydrazine, dimethylhydrazine, terbutylhydrazine, phenylhydrazine, or amines), complexes thereof, salts thereof, derivatives thereof, or combinations thereof. Other reducing agents include a reducing sugar agent or an organic reducing agent, such as glucose, glyoxylic acid monohydrate, formaldehyde, complexes thereof, salts thereof, derivatives thereof, or combinations thereof.

The waste solution may be exposed to an optional treatment during step 120 while being flowed from feed tank 310, through conduit system 340 to either immersion tank 320. The optional treatment may include increasing the temperature of waste solution, diluting the waste solution by adding water, or adjusting the pH value of the waste solution. An in-line heater (not shown) may be used to heat the waste solution while flowing through conduit system 340. In one example, the waste solution may be heated to or maintained at a temperature within a range from about 20° C. to about 120° C., preferably, from about 25° C. to about 100° C., and more preferably, from about 50° C. to about 80° C. Other treatments include adjusting the pH value of the waste solution by adding an acidic solution or a basic solution by pH adjusting device 336. In one example, the waste solution may be adjusted to have a pH value within a range from about 4 to about 12, preferably, from about 4.5 to about 10, and more preferably, from about 4 to about 9.

Waste abatement system 300 further contains feed pump 324, flow meter 326, and valve 325 connected to and in fluid communication with conduit system 340. Feed pump 324, flow meter 326, and valve 325 may be used to control the flow rate of the waste solution passing through waste abatement system 300. Also, waste abatement system 300 contains feed pump 332, sediment trap 334, and heat exchange 337 connected to conduit system 340. Heat exchange 337 is controlled by cooling system 338 and is in thermal communication with cooling system 338 by cooling line 339.

During step 130, the waste solution is exposed to catalytic system 321 containing catalyst 360 during a demetallization process. Catalyst 360 is usually a high surface area catalyst, such as metallic wool, and is used during the demetallization process of the waste solution. In one embodiment, catalyst 360 may be contained within basket 319 that is positioned in immersion tank 320, as depicted in FIGS. 3A-3C. Basket 319 may be fixed within immersion tank 320, but preferably, basket 319 is removable and positioned on supports 327.

In one embodiment, basket 319 is composed of an electrically insulating material, such as plastic or ceramic. In an alternative embodiment, basket 319 is composed of a metallic wire basket. During the demetallization process, both catalyst 360 and basket 319 may be coated by the metallic waste derived from the waste solution. Heater controller 362 could be resistively coupled to catalyst 360 or basket 319.

In one embodiment, FIG. 3B depicts catalytic system 321 containing basket 319 located within immersion tank 320. Basket 319 includes lid 365 connected to body 367 by hinge 363. Basket 319 may be positioned on supports 327 to hang within immersion tank 320. Handle 368 positioned on lid 365 may be used to remove basket 319 from immersion tank 320. Waste solution may flow into immersion tank 320 from inlet 364, be exposed to catalyst 360 for a predetermined time, and subsequently flow from immersion tank 320 by outlet 366. Sediment trap 328 may be positioned at the lower portion of body 367 and is used to collect particulates from the waste solution.

In another embodiment, FIG. 3C depicts catalytic system 321 containing immersion tank 320 encompassed by external heater 323. Heater controller 362 may be used to regulate or control external heater 323. Basket 319 may be positioned on supports 327 by ridge 329 to protrude into immersion tank 320.

In one embodiment, catalyst 360 is a metallic catalyst having a plating surface for forming metallic waste material deposited from the metal ions of the waste solution. Catalyst 360 may be a metallic catalyst with a high surface area and may have the structure of metallic wool, wire bundle, sponge, nano-particulate, foil, slug, sphere, shot, or derivatives thereof. Catalyst 360 may contain pure, solid, or heterogeneous materials or may be a clad material containing a continuous coating or a discontinuous coating of a catalytic material.

In one example, catalyst 360 is an iron-containing metallic catalyst, such as steel wool. In other examples, catalyst 360 may be other metallic wool catalyst, such as copper-containing wool, nickel-containing wool, or chromium-containing wool. In another embodiment, catalyst 360 may contain a catalytic material continuously or discontinuously coated thereon that may be used as the plating surface. Therefore, the plating surface of catalyst 360 may contain palladium, platinum, iron, nickel, chromium, stainless steel, steel, copper, cobalt, alloys thereof, or combinations thereof.

A pretreatment process may be used to remove contaminants, such as organic residues or oxides, while expose the plating surface of catalyst 360. Pretreatment processes may include exposing catalyst 360 to a surfactant or soap solution to remove a film, a residue, particulates, or other contaminants from the plating surface. Subsequently, catalyst 360 may be exposed to a water rinse step to further remove contaminants and any residual surfactant solution. Also, catalyst 360 may be exposed to an acid solution to remove surface oxides from the plating surface. Thereafter, catalyst 360 may be exposed to a water rinse step to further remove contaminants and any residual acid solution. Once the plating surface has been cleaned, catalyst 360 may be stored under an inert atmosphere containing nitrogen, argon, or helium.

In one embodiment, waste solution contained within immersion tank 320 may be heated by immersion heater 322 (FIG. 3A). In another embodiment, catalyst 360 is resistively coupled to heater controller 362 (FIG. 3B). In another embodiment, external heater 323 and heater controller 362 are used to heat immersion tank 320, catalyst 360, and the waste solution (FIG. 3C). Generally, the waste solution, immersion tank 320 and/or catalyst 360 may be heated to a temperature within a range from about 25° C. to about 100° C. In one example, catalyst 360 is a bundle of steel wool that has been pretreated to expose a surface of steel or iron. A pretreatment process may include exposing the steel wool to a soap solution, a water rinse, an acid rinse (e.g., nitric acid), a water rinse, and stored under an inert atmosphere (e.g., nitrogen or argon). In another example, catalyst 360 is a bundle of steel wool that has been continuously or discontinuously coated with metallic cobalt or copper. In other examples, the steel wool has been continuously or discontinuously coated with metallic platinum or palladium.

The waste solution may be exposed to an optional treatment during step 140 while being flowed from either immersion tank 320 or catalytic system 321, through conduit system 340 to column systems 330a and 330b. The optional treatment may include adjusting the temperature of waste solution, diluting the waste solution by adding water, or adjusting the pH value of the waste solution. An in-line heater (not shown) may be used to heat the waste solution while flowing through conduit system 340. Alternative, cooling system 338 with heat exchange 337 may be used to cool the waste solution while flowing through conduit system 340. In one example, the waste solution may be heated to, cooled to, or maintained at a temperature within a range from about 20° C. to about 120° C., preferably, from about 25° C. to about 100° C., and more preferably, from about 50° C. to about 80° C. Other treatments include adjusting the pH value of the waste solution by adding an acidic solution or a basic solution by pH adjusting device 336. In one example, the waste solution may be adjusted to have a pH value within a range from about 4 to about 12, preferably, from about 4.5 to about 10, and more preferably, from about 4 to about 9.

During step 150, the waste solution is flowed from conduit system 340 through column systems 330a and 330b to further demetallize the waste solution during a de-ionization process. Metallic ions are removed from the waste solution while the waste solution is exposed to an ion-exchange resin within column systems 330a and 330b. The metallic ions that may be removed from the waste solution by column systems 330a and 330b include copper, cobalt, tungsten, molybdenum, tin, chromium, nickel, platinum, palladium, silver, gold, and combinations thereof.

In one embodiment, waste abatement system 300 may contain a single column system 330a or column system 330b having an ion-exchange resin or bed. In another embodiment, as depicted in FIG. 3A, waste abatement system 300 contains at least two column systems 330a and 330b connected in parallel or series with each other. By-pass line 341 may be positioned between two or more column systems 330a and 330b containing ion-exchange beds. Valves 343a, 343b, 343c, and 345 and by-pass line 341 may be used to direct the flow of the waste solution to column system 330a, column system 330b, or both. In another example, waste abatement system 300 may use detector 342 to determine when the ion-exchange bed has such low efficiency that by-pass line 341 may automatically be switched to for directing the waste solution from the less efficient ion-exchange bed to a second ion-exchange bed, such as between column system 330a to column system 330b, or vice versa.

In one example, column system 330b and by-pass line 341 may be by-passed by positioning valves 343c and 345 to direct the waste solution from conduit system 340, through column system 330a, and to detector 342, acid waste neutralization system 344, and/or collection tank 370. In another example, column system 330a and by-pass line 341 may be by-passed by positioning valves 343a, 343b, 343c, and 345 to direct the waste solution from conduit system 340, through column system 330b, and to detector 342, acid waste neutralization system 344, and/or collection tank 370. In another example, column systems 330a and 330b may both be used by positioning valves 343a, 343b, 343c, and 345 to direct the waste solution from conduit system 340, through column systems 330a and 330b, and to detector 342, acid waste neutralization system 344, and/or collection tank 370. In another example, column systems 330a and 330b may both be by-passed by positioning valves 343a, 343b, 343c, and 345 to direct the waste solution from conduit system 340, through by-pass line 341, and to detector 342, acid waste neutralization system 344, and/or collection tank 370.

Column systems 330a and 330b each contain at least one bed of an ion exchange resin which may include iminodiacetic resins, amidoxime resins, amino-phosphonic resins, bis-picolylamine resins, derivatives thereof, or combinations thereof. In one embodiment, the ion-exchange resin is in proton form or acidic form, versus a salt form, such as sodium form. Ion exchange resins are available from Purolite Company, located in Bala Cynwyd, Pa. Examples include AMBERLITE™ IRC748 for metal removal (e.g., Co or Cu) and AMBERLITE™ IRA743 for boron removal, both available from Rohm and Haas, located in Philadelphia, Pa.

After the de-ionization process at step 150, the concentration of metal ions, reducing agents, hydrogen gas, or other components of the treated waste solution may be monitored or determined during step 160. The treated waste solution exiting column systems 330a and 330b is transferred through conduit system 340, pass detector 342 (step 160), and flowed to acid waste neutralization system 344 (step 170) or collection tank 370 (step 180). If a predetermined concentration of a waste solution component (e.g., metal ion concentration) has not been met, then the treated waste solution may be recirculated or looped through column systems 330a and 330b. In one embodiment, detector 342 may be used to determine the concentration of metal ions, reducing agents, or hydrogen gas within the treated waste solution.

In one embodiment, the treated waste solution may be monitored or determined during step 160 to have a metal ion concentration of about 5 ppm or less, preferably, about 1 ppm or less, more preferably, about 0.1 ppm or less, and more preferably, about 10 ppb or less at step 160. The metal ions include copper, cobalt, tungsten, nickel, platinum, palladium, molybdenum, chromium, silver, gold, zinc, ruthenium, rhodium, rhenium, and combinations thereof. In one example, the treated waste solution contains a copper concentration of about 1 ppm or less, preferably, about 0.1 ppm or less, and more preferably, about 10 ppb or less. In another example, the treated waste solution contains a cobalt concentration of about 1 ppm or less, preferably, about 0.1 ppm or less, and more preferably, about 10 ppb or less.

Also, the treated waste solution may be monitored or determined during step 160 to have a reducing agent concentration of about 5 ppm or less, preferably, about 1 ppm or less, more preferably, about 0.1 ppm or less, and more preferably, about 10 ppb or less during step 160. In one example, the treated waste solution contains a DMAB concentration of about 1 ppm or less, preferably, about 0.1 ppm or less, and more preferably, about 10 ppb or less. In another example, the treated waste solution contains a hypophosphite concentration of about 1 ppm or less, preferably, about 0.1 ppm or less, and more preferably, about 10 ppb or less.

In one embodiment, detector 342 is a spectroscopic detector coupled with conduit system 340 and used to perform in situ spectroscopic analysis of waste solution downstream from column systems 330a and 330b during step 160. For example, conduit system 340 may be attached in fluid communication with detector 342 so that waste solution passes through detector 342. In another example, detector 342 may be coupled outside of conduit system 340 over a window (not shown) positioned on conduit system 340. Detector 342 may be networked with the control system and remotely monitored by an operator. Detector 342 may be an UV-vis spectrometer, an IR or FT-IR spectrometer, a Raman spectrometer, or derivatives thereof. Spectrometers that may be used as detector 342 for UV-vis, IR, or FT-IR spectroscopy are available from Thermo Electron Corporation. Spectrometers that may be used as detector 342 for Raman spectroscopy are available from Thermo Electron Corporation and Kaiser Optical Systems.

In another embodiment, outlet 372 may be used to remove an aliquot sample of waste solution downstream from column systems 330a and 330b during step 160. Subsequently, the aliquot sample may be analyzed to determine the concentration of metal ions, reducing agents, hydrogen gas, or other components of the waste solution. In one example, the aliquot sample may be analyzed by an inductively-coupled plasma (ICP) analysis process. In another example, the aliquot sample may be analyzed by an iodometric titration technique. Other examples for analyzing aliquot samples of the waste solution include UV-vis, FT-IR, or Raman spectroscopic processes.

In another embodiment, process 100 may be conducted with waste abatement system 400 containing catalytic conduit 450 (e.g., metallic hollow coil or tubing), as depicted in FIGS. 4A-4F. Catalytic conduit 450 may be easily removed from waste abatement system 400 for recycling and recovery of the plated metallic waste. Subsequently, catalytic conduit 450 may be disposed of or reused within waste abatement system 400. Waste abatement system 400 contains feed tank 410, catalytic conduit 450, and column systems 430a and 430b. Conduit system 440 connects at least feed tank 410, catalytic conduit 450, and column systems 430a and 430b. In one example, a waste solution may be collected in feed tank 410, exposed to catalytic conduit 450 within catalytic conduit system 420, passed through column systems 430a and 430b, and flowed to acid waste neutralization system 444 or collection tank 470 for final disposal.

Feed tank 410 may be fed from process liquid source 412, process by-pass source 414, or both, also connected to and in fluid communication with conduit system 440. Feed tank 410 contains at least one inlet 409 for receiving depleted solutions, wash solutions, and other waste solutions and at least one outlet 411 for distributing the combined waste solution. In one example, process liquid source 412 contains a depleted plating solution remaining after a deposition process, such as an e-less process or an ECP process. Process liquid source 412 and process by-pass source 414 may be connected to conduit system 440 by three-way valve 413 or by independent single valves (not shown).

Water source 416 is to connected conduit system 440 and may be used to supply water (e.g., deionized water) throughout waste abatement system 400, such as to feed tank 410, as well as to catalytic conduit system 420 and a variety of places along conduit system 440, such as between feed tank 410 and catalytic conduit 450 or between and catalytic conduit 450 and column systems 430a and 430b. Water source 416 may be a water tank or other vessel for containing water. Alternatively, water source 416 may be a hose, a pipe, or other feed line that supplies water to waste abatement system 400. Water, from water source 416, may be used during a waste abatement process, but is usually used to rinse waste abatement system 400 during a cleaning process after finishing the waste abatement process.

Valves 415a, 415b, and 415c may be used to control the flow of water from water source 416 to specific regions of waste abatement system 400. For example, valve 415a may be used for controlling the flow of water to feed tank 410, valve 415b may be used for controlling the flow of water upstream of catalytic conduit 450, valve 415c may be used for controlling the flow of water upstream of column systems 430a and 430b.

Figure 4A:
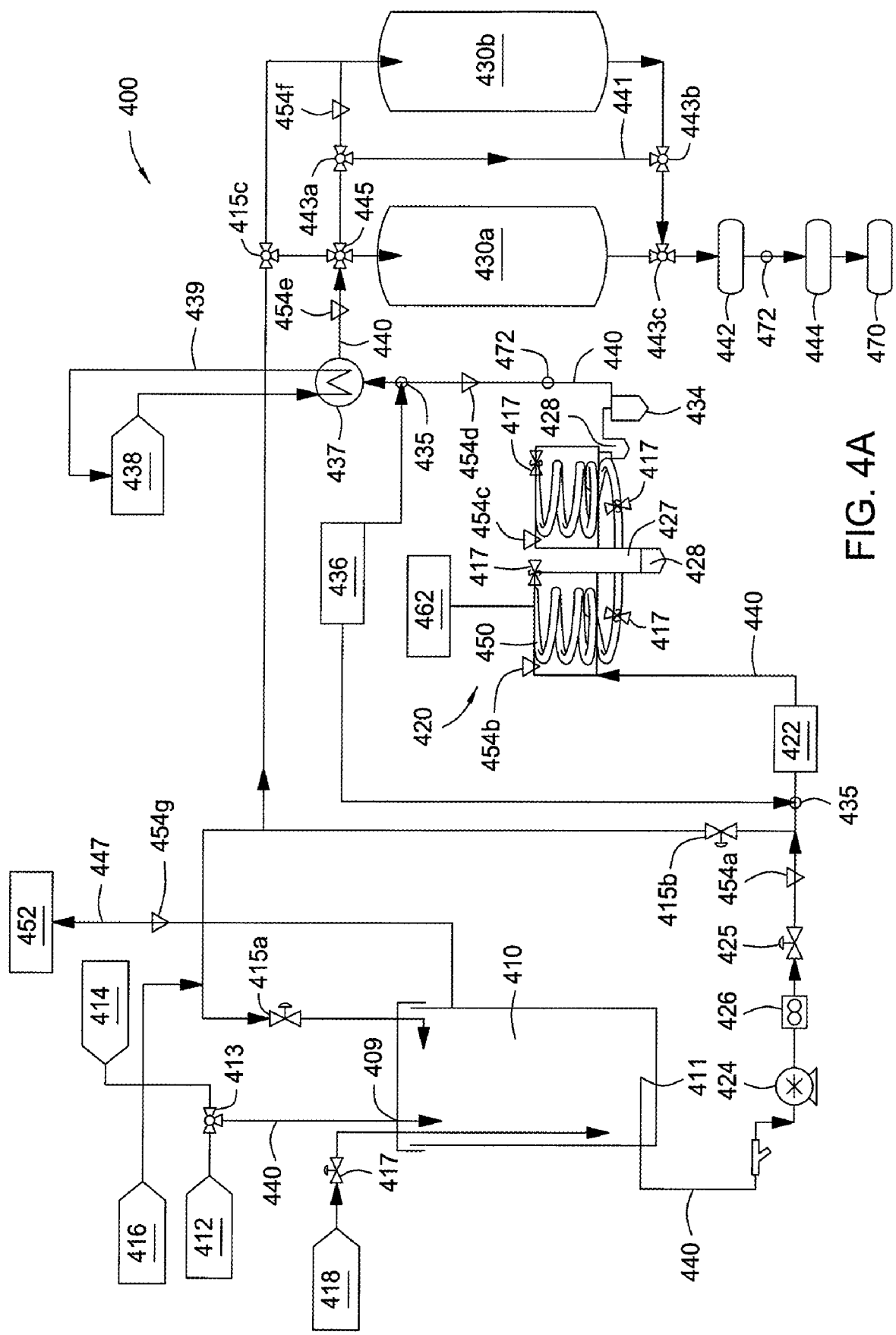
FIG. 4A depicts a schematic illustration of another waste abatement system as described by embodiments herein.

FIG. 4A further depicts pH adjusting device 436 connected to and in fluid communication with conduit system 440 and may be used to adjust the pH of the waste solution throughout waste abatement system 400. The pH adjusting device 436 may be coupled upstream or downstream from catalytic conduit system 420 and may be used to increase or decrease the pH of the waste solution. In one embodiment, an in situ pH probe or sensor, such as probe 435 may be placed upstream or downstream from catalytic conduit 450. Alternative, aliquot samples of the waste solution may be removed at various points along conduit system 440 and the pH value of the waste solution may be determined by an external pH meter or other means.

In one example, pH adjusting device 436 is configured to combine a basic pH adjusting agent with the waste solution at a concentration to increase the pH value of the waste solution by a pH unit of about 1.0 upstream from catalytic conduit system 420. In another example, pH adjusting device 436 is configured to increase the pH value of the waste solution by a pH unit of about 1.0 downstream from upstream from catalytic conduit system 420. The basic pH adjusting agent may contain an aqueous solution, an organic solution, or a mixture thereof and include alkaline or rare earth hydroxides and ammonium or alkylammonium hydroxides. Examples of basic pH adjusting agents include sodium hydroxide, potassium hydroxide, lithium hydroxide, calcium hydroxide, ammonium hydroxide, tetramethylammonium hydroxide, tetraethylammonium hydroxide, tetramethoxyammonium hydroxide, trimethoxyammonium hydroxide, dimethoxyammonium hydroxide, methoxyammonium hydroxide, tetraethoxyammonium hydroxide, triethoxyammonium hydroxide, diethoxyammonium hydroxide, ethoxyammonium hydroxide, derivatives thereof, and combinations thereof.

In one example, pH adjusting device 436 is configured to combine an acidic pH adjusting agent with the waste solution at a concentration to decrease the pH value of the waste solution by a pH unit of about 1.0 upstream from catalytic conduit system 420. In another example, pH adjusting device 436 is configured to decrease the pH value of the waste solution by a pH unit of about 1.0 downstream from upstream from catalytic conduit system 420. The acidic pH adjusting agent usually contains an aqueous solution. Examples of acidic pH adjusting agents include hydrochloric acid, sulfuric acid, hypophosphoric acid, hydrofluoric acid, nitric acid, citric acid, derivatives thereof, and combinations thereof.

At least one gas supply 418 may be connected to and in fluid communication with conduit system 440 for supplying a gas throughout waste abatement system 400. A flushing gas, such as an inert gas (e.g., nitrogen, argon, helium, or combinations thereof) may be supplied to feed tank 410 or waste abatement system 400 from gas supply 418. The flushing gas may be used to pressurize waste abatement system 400 or any portion thereof (e.g., feed tank 410, catalytic conduit 450, column systems 430a and 430b, and conduit system 440). Valve 417 may be used to control the gas flow from gas supply 418 to feed tank 410 or waste abatement system 400.

Degassing valves 454a-454g may be used to release or vent specified gases from waste abatement system 400. In one example, degassing valves 454a-454g may be adjusted to release undesirable gases (e.g., hydrogen gas) from conduit system 440 at a predetermined pressure, such as when an internal pressure of conduit system 440 is at or above about 760 Torr. Degassing exhaust valves may be positioned throughout waste abatement system 400 in various quantities, within a similar region, or between common stations. Degassing valve 454a may be positioned between feed tank 410 and catalytic conduit system 420. Degassing valves 454b and 454c may be positioned between feed tank 410 and catalytic conduit 450 or positioned within catalytic conduit system 420. Degassing valves 454d, 454e, and 454f may be positioned along conduit system 440 and between catalytic conduit system 420 and column systems 430a and 430b. Degassing valve 454g may be positioned along exhaust line 447 and between feed tank 410 and ventilation system 452.

Generally, degassing valves 454a-454g may vent to the outside of waste abatement system 400 where the undesirable gas is drawn into ventilation system 452 through exhaust line 447. Although not depicted, degassing valves 454a-454f may each be independently coupled to and in fluid communication with ventilation system 452 through exhaust line 447, similar to degassing valves 254a-254g coupled to and in fluid communication with ventilation system 252 through exhaust line 253, as depicted in FIG. 2. Valves that may be used as degassing valves 454a-454g include CKM Self-Closing Valve available from Plast-O-Matic Valves, Inc., located in Cedar Grove, N.J.

The flushing gas may be flowed through waste abatement system 400 to prevent or minimize a build-up of hydrogen gas or other undesirable gases within waste abatement system 400. In one example, the flushing gas purges any evolved hydrogen gas out of waste abatement system 400 to form an exhaust gas. The exhaust gas may be maintained with a hydrogen concentration of about 5 mol % or less, preferably, about 3.8 mol % or less, more preferably, about 1 mol % or less, and more preferably, about 0.5 mol % or less. The flushing gas may be used to pressurize waste abatement system 400 or any portion thereof (e.g., feed tank 410, catalytic conduit 450, column systems 430a and 430b, and conduit system 440). The over-pressure formed by the flushing gas advantageously reduces or eliminates the diffusion of oxygen gas into waste abatement system 400. Therefore, the waste solution may be maintained with a lower oxygen concentration than if exposed to the ambient air. For example, the waste solution may be maintained with an oxygen concentration of about 100 ppm or less, preferably, about 10 ppm or less, and more preferably, about 1 ppm or less.

In one embodiment, waste abatement system 400 has automatic controls with fail safes, as well as other safety features that may be used during waste abatement process 100. For example, if the internal pressure of waste abatement system 400 exceeds a predetermined pressure (e.g., over 760 Torr), the controller will automatically stop process 100. Waste effluents coming from process liquid source 412 and process by-pass source 414 may be completely stopped or have a reduced flow rate in order to stop process 100. In another example of a safety feature, if the flow of flushing or purge gas within waste abatement system 400 ceases, the controller will automatically stop process 100.

During step 110, the waste effluents from process liquid source 412 and/or process by-pass source 414 may be collected within feed tank 410 to form a waste solution. In one example, process liquid source 412 contains a depleted plating solution left over after a deposition process, such as an electroless deposition process or an electrochemical plating process. Generally, the waste solution may be a plating solution or contain a plating solution, such as a chemical plating solution, which may contain metal ions, reducing agents, or both, as well as other components. The metal ions may include copper, cobalt, tungsten, nickel, platinum, palladium, molybdenum, tin, chromium, silver, gold, zinc, ruthenium, rhodium, rhenium, alloys thereof, or combinations thereof.

The reducing agents may include a phosphorous-containing reducing agent (e.g., hypophosphorous acid or hypophosphites), a boron-containing reducing agent (e.g., boranes, alkylamine boranes, dimethylamine borane, borohydrides), nitrogen-containing reducing agent (e.g., hydrazine, methylhydrazine, dimethylhydrazine, terbutylhydrazine, phenylhydrazine, or amines), complexes thereof, salts thereof, derivatives thereof, or combinations thereof. Other reducing agents include a reducing sugar agent or an organic reducing agent, such as glucose, glyoxylic acid monohydrate, formaldehyde, complexes thereof, salts thereof, derivatives thereof, or combinations thereof.

The waste solution may be exposed to an optional treatment during step 120 while being flowed from feed tank 410, through conduit system 440 to either catalytic conduit 450. The optional treatment may include increasing the temperature of waste solution, diluting the waste solution by adding water, or adjusting the pH value of the waste solution. An in-line heater (not shown) may be used to heat the waste solution while flowing through conduit system 440. In one example, the waste solution may be heated to or maintained at a temperature within a range from about 20° C. to about 120° C., preferably, from about 25° C. to about 100° C., and more preferably, from about 50° C. to about 80° C. Other treatments include adjusting the pH value of the waste solution by adding an acidic solution or a basic solution by pH adjusting device 436. In one example, the waste solution may be adjusted to have a pH value within a range from about 4 to about 12, preferably, from about 4.5 to about 10, and more preferably, from about 4 to about 9.

Waste abatement system 400 further contains feed pump 424, flow meter 426, and valve 425 connected to and in fluid communication with conduit system 440. Feed pump 424, flow meter 426, and valve 425 may be used to control the flow rate of the waste solution passing through waste abatement system 400. Also, waste abatement system 400 contains sediment trap 434 and heat exchange 437 connected to conduit system 440, and usually contains a feed pump (not shown). Heat exchange 437 is controlled by cooling system 438 and is in thermal communication with cooling system 438 by cooling line 439. The waste solution may be exposed to catalytic conduit 450 for a predetermined time by adjusting the flow rate. FIG. 4A further depicts sediment trap 428 positioned in-line and at a lower portion of catalytic conduit system 420, such as at passageway 427. Sediment trap 428 may be used to collect particulates from the waste solution.

In one embodiment, the waste solution is exposed to catalytic conduit system 420 containing at least one catalytic conduit 450 having an internal catalytic surface during a demetallization process (step 130). Catalytic conduit 450 is usually a metallic hollow coil or a metallic tube and is used during the demetallization process of the waste solution. Catalytic conduit system 420 usually contains two or more catalytic conduits 450 positioned side by side and/or positioned one on top of the other, as depicted in FIGS. 4A-4F. For example, catalytic conduit system 420 may have two catalytic conduits 450 (FIGS. 4A and 4C-4E), three catalytic conduits 450 (FIG. 4B), or six catalytic conduits 450 (FIG. 4F).

Figure 4B:
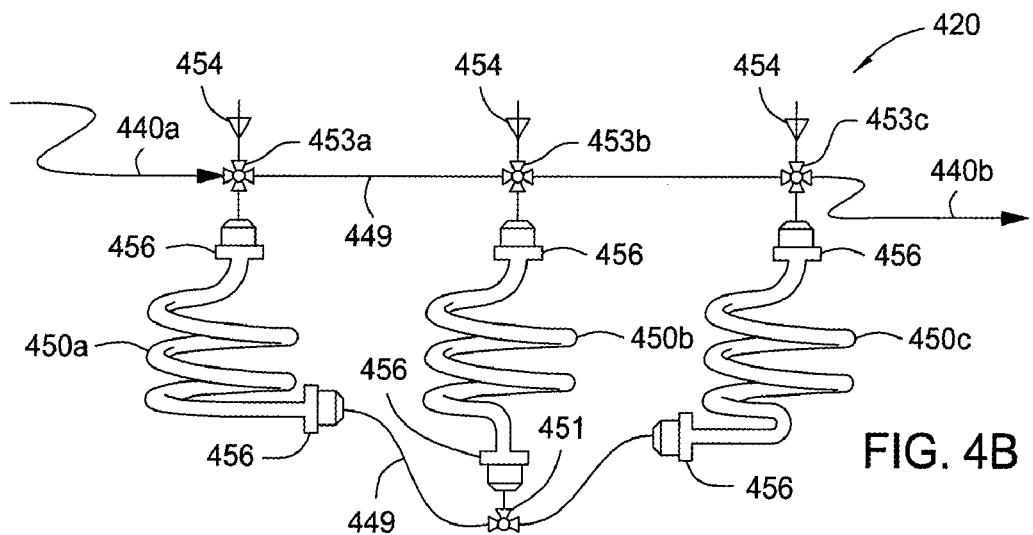
FIGS. 4B-4F depict schematic illustrations of catalytic conduit systems used in waste abatement system as described by embodiments herein.
Figure 4C:
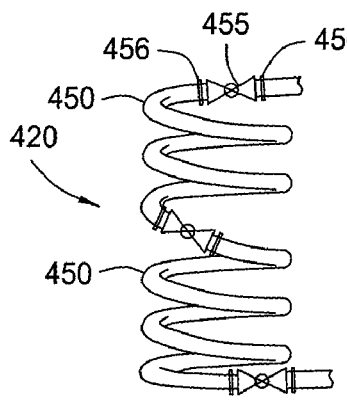

In one embodiment, FIG. 4B depicts catalytic conduit system 420 containing catalytic conduits 450a-450c. Catalytic conduits 450a-450c may have connectors 456 on each end. Connectors 456 are adapted to couple with a variety of conduits and valves. In one example, connectors 456 are fittings, such as quick connect/disconnect fittings, available from Swagelok Company, located in Solon, Ohio. On one end, catalytic conduit 450a is connected to and in fluid communication with four-way valve 453a by conduit 449, catalytic conduit 450b is connected to and in fluid communication with four-way valve 453b by conduit 449, and catalytic conduit 450c is connected to and in fluid communication with four-way valve 453c by conduit 449. Four-way valves 453a-453c are connected together by conduit 449 and are each connected with degassing valves 454. Catalytic conduits 450a-450c are also connected to and in fluid communication with three-way valve 451 by conduit 449.

Waste solution may flow into catalytic conduit system 420 from inlet conduit 440a and flow out of catalytic conduit system 420 from outlet conduit 440b. Inlet conduit 440a and outlet conduit 440b are connected with conduit system 440. Multiple flow patterns of waste solution through catalytic conduits 450a-450c may be used during demetallization processes.

In one example, four-way valve 453a directs the waste solution into catalytic conduit 450a, three-way valve 451 directs the waste solution into catalytic conduit 450b, four-way valve 453b directs the waste solution to four-way valve 453c, which directs the waste solution out of catalytic conduit system 420 through outlet conduit 440b. Catalytic conduit 450c is by-passed and may be removed and replaced during the demetallization process.

In another example, four-way valve 453a directs the waste solution to four-way valve 453b, which directs the waste solution into catalytic conduit 450b, three-way valve 451 directs the waste solution into catalytic conduit 450c, four-way valve 453c directs the waste solution out of catalytic conduit system 420 through outlet conduit 440b. Catalytic conduit 450a is by-passed and may be removed and replaced during the demetallization process.

In another example, four-way valve 453a directs the waste solution into catalytic conduit 450a, three-way valve 451 directs the waste solution into catalytic conduit 450c, four-way valve 453c which directs the waste solution out of catalytic conduit system 420 through outlet conduit 440b. Catalytic conduit 450b is by-passed and may be removed and replaced during the demetallization process.

FIGS. 4C-4F depict catalytic conduit system 420 containing catalytic conduit 450 containing connectors 456 and valves 455. Connectors 456 are adapted to couple with a variety of conduits and valves, such as valve 455. In one example, connectors 456 are fittings, such as quick connect/disconnect fittings, available from Swagelok Company, located in Solon, Ohio. Valves 455 may be closed in order to prevent ambient air from entering catalytic conduit 450.

Figure 4D:
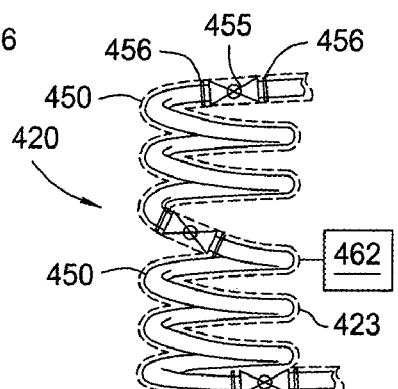

In one embodiment, heater controller 462 may be resistively coupled to catalytic conduit 450 for heating catalytic conduit 450 and waste solution therein, as depicted in FIG. 4A. In another embodiment, FIG. 4D depicts catalytic conduit system 420 containing catalytic conduit 450 encompassed by external heater 423. Heater controller 462 may be used to regulate or control external heater 423. In one example, heater controller 462 and external heater 423 may be used to control and maintain a gradient temperature along the length of catalytic conduit 450 of heating catalytic conduit 450 and waste solution therein. Also, in-line heater 422 may be used to heat the waste solution while flowing through conduit system 440 upstream from catalytic conduit system 420. Generally, catalytic conduit 450 and the waste solution therein may be heated to a temperature within a range from about 25° C. to about 100° C.

In one embodiment, catalytic conduit 450 may be a copper-containing coil, tube, or pipe having an internal plating surface for forming metallic waste material deposited from the metal ions of the waste solution. In one example, catalytic conduit 450 is a copper coil having an internal plating surface containing copper. In another example, catalytic conduit 450 is a steel coil (e.g., stainless steel) having a plating surface containing iron. Catalytic conduit 450 may be continuously or discontinuously coated by another catalytic material, such as palladium, platinum, iron, nickel, chromium, stainless steel, steel, copper, cobalt, alloys thereof, or combinations thereof.

Figure 4E:
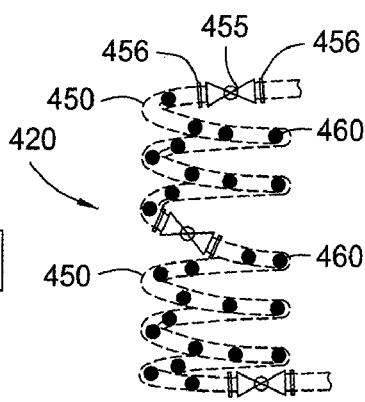
Figure 4F:
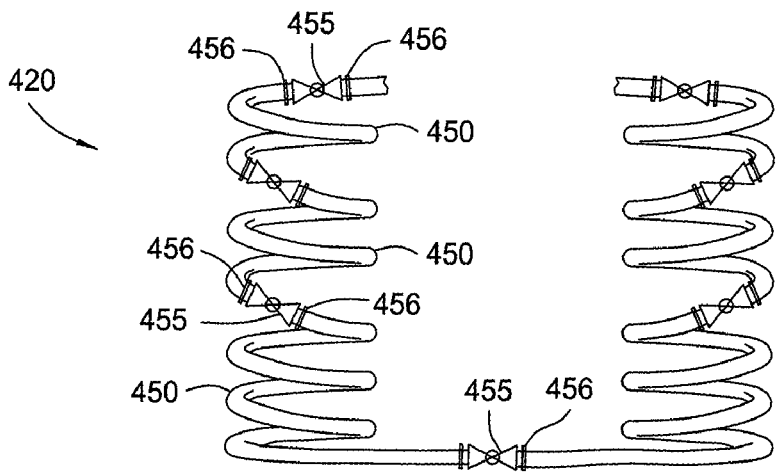

In another embodiment, catalytic conduit 450 contains catalyst 460 (e.g., metallic wool), as depicted in FIG. 4E. Catalyst 460 may be the same or a similar material as previously described for catalyst 360. Catalytic conduit 450 containing catalyst 460 may be easily removed from waste abatement system 400 for recycling and recovery of the plated metallic waste. Subsequently, catalytic conduit 450 containing catalyst 460 may be disposed of or reused within waste abatement system 400.

In one embodiment, catalyst 460 is a metallic catalyst having a plating surface for forming metallic waste material deposited from the metal ions of the waste solution. Catalyst 460 may be a metallic catalyst with a high surface area and may have the structure of metallic wool, wire bundle, sponge, nano-particulate, foil, slug, sphere, shot, or derivatives thereof. Catalyst 460 may contain pure, solid, or heterogeneous materials or may be a clad material containing a continuous coating or a discontinuous coating of a catalytic material.

In one example, catalyst 460 is an iron-containing metallic catalyst, such as steel wool. In other examples, catalyst 460 may be other metallic wool catalyst, such as copper-containing wool, nickel-containing wool, or chromium-containing wool. In another embodiment, catalyst 460 may contain a catalytic material continuously or discontinuously coated thereon that may be used as the plating surface. Therefore, the plating surface of catalyst 460 may contain palladium, platinum, iron, nickel, chromium, stainless steel, steel, copper, cobalt, alloys thereof, or combinations thereof.

In one example, catalytic conduit 450 is a copper coil that has been pretreated to expose an internal surface of copper. Catalytic conduit 450 may be exposed to a dilute acid, such as hydrochloric acid or sulfuric acid. In another example, catalytic conduit 450 is a copper coil that has been continuously or discontinuously coated with metallic cobalt or nickel. In other examples, the copper coil has been continuously or discontinuously coated with metallic platinum or palladium.

The waste solution may be exposed to an optional treatment during step 140 while being flowed from catalytic conduit system 420, through conduit system 440 to column systems 430a and 430b. The optional treatment may include adjusting the temperature of waste solution, diluting the waste solution by adding water, or adjusting the pH value of the waste solution. In one embodiment, an in-line heater (not shown) may be used to heat the waste solution while flowing through conduit system 440. Alternative, cooling system 438 with heat exchange 437 may be used to cool the waste solution while flowing through conduit system 440. In one example, the waste solution may be heated to, cooled to, or maintained at a temperature within a range from about 20° C. to about 120° C., preferably, from about 25° C. to about 100° C., and more preferably, from about 50° C. to about 80° C. Other treatments include adjusting the pH value of the waste solution by adding an acidic solution or a basic solution by pH adjusting device 436. In one example, the waste solution may be adjusted to have a pH value within a range from about 4 to about 12, preferably, from about 4.5 to about 10, and more preferably, from about 4 to about 9.

During step 150, the waste solution is flowed from conduit system 440 through column systems 430a and 430b to further demetallize the waste solution during a de-ionization process. Metallic ions are removed from the waste solution while the waste solution is exposed to an ion-exchange resin within column systems 430a and 430b. The metallic ions that may be removed from the waste solution by column systems 430a and 430b include copper, cobalt, tungsten, molybdenum, tin, chromium, nickel, platinum, palladium, silver, gold, and combinations thereof.

In one embodiment, waste abatement system 400 may contain a single column system 430a or column system 430b having an ion-exchange resin or bed. In another embodiment, as depicted in FIG. 4A, waste abatement system 400 contains at least two column systems 430a and 430b connected in parallel or series with each other. By-pass line 441 may be positioned between two or more column systems 430a and 430b containing ion-exchange beds. Valves 443a, 443b, 443c, and 445 and by-pass line 441 may be used to direct the flow of the waste solution to column system 430a, column system 430b, or both. In another example, waste abatement system 400 may use detector 442 to determine when the ion-exchange bed has such low efficiency that by-pass line 441 may automatically be switched to for directing the waste solution from the less efficient ion-exchange bed to a second ion-exchange bed, such as between column system 430a to column system 430b, or vice versa.

In one example, column system 430b and by-pass line 441 may be by-passed by positioning valves 443c and 445 to direct the waste solution from conduit system 440, through column system 430a, and to detector 442, acid waste neutralization system 444, and/or collection tank 470. In another example, column system 430a and by-pass line 441 may be by-passed by positioning valves 443a, 443b, 443c, and 445 to direct the waste solution from conduit system 440, through column system 430b, and to detector 442, acid waste neutralization system 444, and/or collection tank 470. In another example, column systems 430a and 430b may both be used by positioning valves 443a, 443b, 443c, and 445 to direct the waste solution from conduit system 440, through column systems 430a and 430b, and to detector 442, acid waste neutralization system 444, and/or collection tank 470. In another example, column systems 430a and 430b may both be by-passed by positioning valves 443a, 443b, 443c, and 445 to direct the waste solution from conduit system 440, through by-pass line 441, and to detector 442, acid waste neutralization system 444, and/or collection tank 470.

Column systems 430a and 430b each contain at least one bed of an ion exchange resin which may include iminodiacetic resins, amidoxime resins, amino-phosphonic resins, bis-picolylamine resins, derivatives thereof, or combinations thereof. In one embodiment, the ion-exchange resin is in proton form or acidic form, versus a salt form, such as sodium form. Ion exchange resins are available from Purolite Company, located in Bala Cynwyd, Pa. Examples include AMBERLITE™ IRC748 for metal removal (e.g., Co or Cu) and AMBERLITE™ IRA743 for boron removal, both available from Rohm and Haas, located in Philadelphia, Pa.

After the de-ionization process at step 150, the concentration of metal ions, reducing agents, hydrogen gas, or other components of the treated waste solution may be monitored or determined during step 160. The treated waste solution exiting column systems 430a and 430b is transferred through conduit system 440, pass detector 442 (step 160), and flowed to acid waste neutralization system 444 (step 170) or collection tank 470 (step 180). If a predetermined concentration of a waste solution component (e.g., metal ion concentration) has not been met, then the treated waste solution may be recirculated or looped through column systems 430a and 430b. In one embodiment, detector 442 may be used to determine the concentration of metal ions, reducing agents, or hydrogen gas within the treated waste solution.

In one embodiment, the treated waste solution may be monitored or determined during step 160 to have a metal ion concentration of about 5 ppm or less, preferably, about 1 ppm or less, more preferably, about 0.1 ppm or less, and more preferably, about 10 ppb or less at step 160. The metal ions include copper, cobalt, tungsten, nickel, platinum, palladium, molybdenum, chromium, silver, gold, zinc, ruthenium, rhodium, rhenium, and combinations thereof. In one example, the treated waste solution contains a copper concentration of about 1 ppm or less, preferably, about 0.1 ppm or less, and more preferably, about 10 ppb or less. In another example, the treated waste solution contains a cobalt concentration of about 1 ppm or less, preferably, about 0.1 ppm or less, and more preferably, about 10 ppb or less.

Also, the treated waste solution may be monitored or determined during step 160 to have a reducing agent concentration of about 5 ppm or less, preferably, about 1 ppm or less, more preferably, about 0.1 ppm or less, and more preferably, about 10 ppb or less during step 160. In one example, the treated waste solution contains a DMAB concentration of about 1 ppm or less, preferably, about 0.1 ppm or less, and more preferably, about 10 ppb or less. In another example, the treated waste solution contains a hypophosphite concentration of about 1 ppm or less, preferably, about 0.1 ppm or less, and more preferably, about 10 ppb or less.

In one embodiment, detector 442 is a spectroscopic detector coupled with conduit system 440 and used to perform in situ spectroscopic analysis of waste solution downstream from column systems 430a and 430b during step 160. For example, conduit system 440 may be attached in fluid communication with detector 442 so that waste solution passes through detector 442. In another example, detector 442 may be coupled outside of conduit system 440 over a window (not shown) positioned on conduit system 440. Detector 442 may be networked with the control system and remotely monitored by an operator. Detector 442 may be an UV-vis spectrometer, an IR or FT-IR spectrometer, a Raman spectrometer, or derivatives thereof. Spectrometers that may be used as detector 442 for UV-vis, IR, or FT-IR spectroscopy are available from Thermo Electron Corporation. Spectrometers that may be used as detector 442 for Raman spectroscopy are available from Thermo Electron Corporation and Kaiser Optical Systems.

In another embodiment, outlet 472 may be used to remove an aliquot sample of waste solution downstream from column systems 430a and 430b during step 160. Subsequently, the aliquot sample may be analyzed to determine the concentration of metal ions, reducing agents, hydrogen gas, or other components of the waste solution. In one example, the aliquot sample may be analyzed by an inductively-coupled plasma (ICP) analysis process. In another example, the aliquot sample may be analyzed by an iodometric titration technique. Other examples for analyzing aliquot samples of the waste solution include UV-vis, FT-IR, or Raman spectroscopic processes.

Figure 5A:
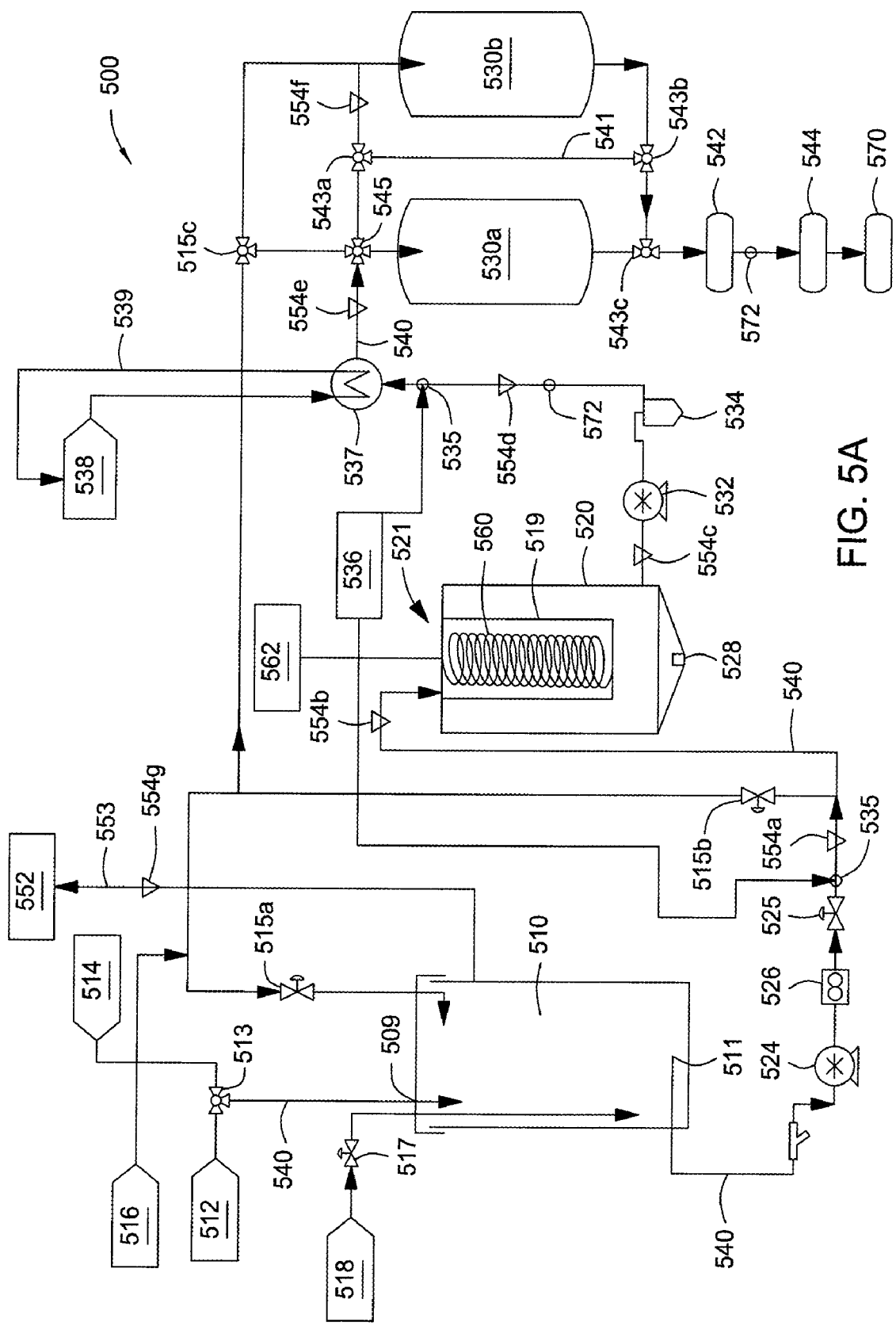
FIG. 5A depicts a schematic illustration of another waste abatement system as described by embodiments herein.
Figure 5B:
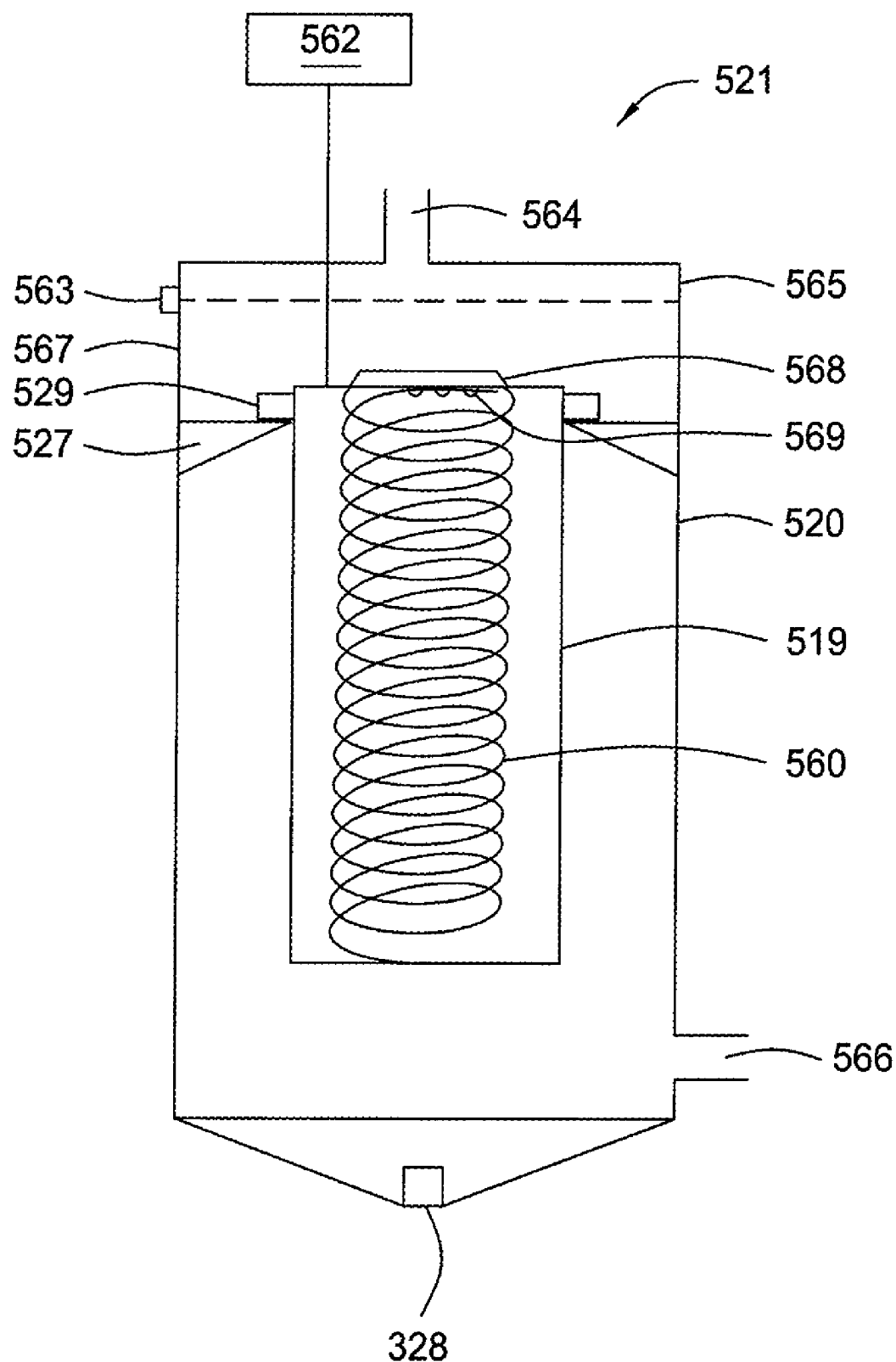
FIGS. 5B-5C depict schematic illustrations of other catalytic systems used in waste abatement system as described by embodiments herein.
Figure 5C:
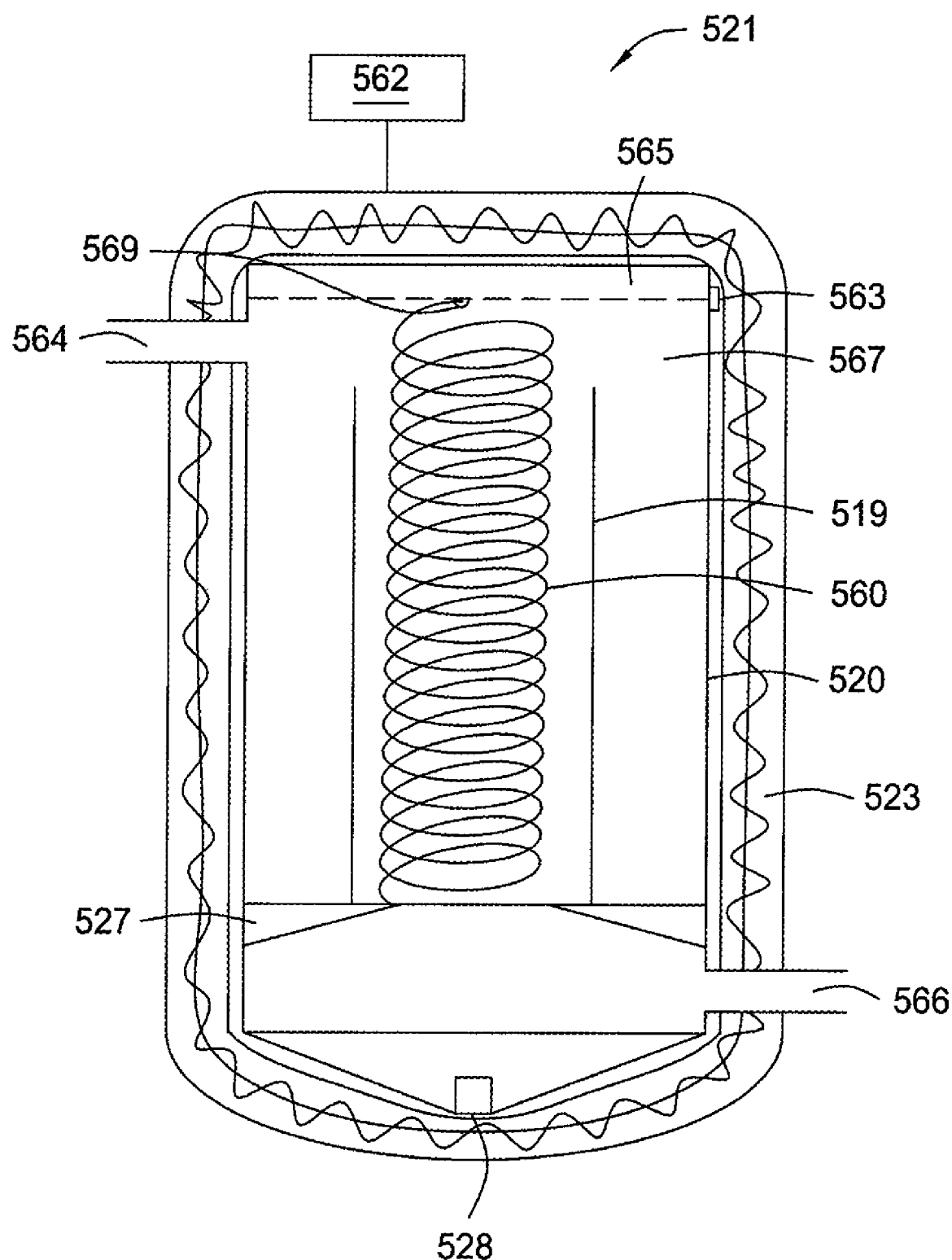

In another embodiment, process 100 may be conducted with waste abatement system 500 containing catalytic heating element 560 (e.g., resistively coupled heating element), as depicted in FIGS. 5A-5C. Catalytic heating element 560 may be easily removed from waste abatement system 500 for recycling and recovery of the plated metallic waste. Subsequently, catalytic heating element 560 may be disposed of or reused within waste abatement system 500. Waste abatement system 500 contains feed tank 510, immersion tank 520, and column systems 530a and 530b. Conduit system 540 connects at least feed tank 510, immersion tank 520, and column systems 530a and 530b. In one example, a waste solution may be collected in feed tank 510, exposed to catalytic heating element 560 within immersion tank 520, passed through column systems 530a and 530b, and flowed to acid waste neutralization system 544 or collection tank 570 for final disposal.

Feed tank 510 may be fed from process liquid source 512, process by-pass source 514, or both, also connected to and in fluid communication with conduit system 540. Feed tank 510 contains at least one inlet 509 for receiving depleted solutions, wash solutions, and other waste solutions and at least one outlet 511 for distributing the combined waste solution. In one example, process liquid source 512 contains a depleted plating solution remaining after a deposition process, such as an e-less process or an ECP process. Process liquid source 512 and process by-pass source 514 may be connected to conduit system 540 by three-way valve 513 or by independent single valves (not shown).

Water source 516 is to connected conduit system 540 and may be used to supply water (e.g., deionized water) throughout waste abatement system 500, such as to feed tank 510, as well as to immersion tank 520 and a variety of places along conduit system 540, such as between feed tank 510 and immersion tank 520 or between and immersion tank 520 and column systems 530a and 530b. Water source 516 may be a water tank or other vessel for containing water. Alternatively, water source 516 may be a hose, a pipe, or other feed line that supplies water to waste abatement system 500. Water, from water source 516, may be used during a waste abatement process, but is usually used to rinse waste abatement system 500 during a cleaning process after finishing the waste abatement process.

Valves 515a, 515b, and 515c may be used to control the flow of water from water source 516 to specific regions of waste abatement system 500. For example, valve 515a may be used for controlling the flow of water to feed tank 510, valve 515b may be used for controlling the flow of water upstream of immersion tank 520, valve 515c may be used for controlling the flow of water upstream of column systems 530a and 530b.

FIG. 5A further depicts pH adjusting device 536 connected to and in fluid communication with conduit system 540 and may be used to adjust the pH of the waste solution throughout waste abatement system 500. The pH adjusting device 536 may be coupled upstream or downstream from immersion tank 520 or catalytic system 521 and may be used to increase or decrease the pH of the waste solution. In one embodiment, an in situ pH probe or sensor, such as probe 535 may be placed upstream or downstream from immersion tank 520. Alternative, aliquot samples of the waste solution may be removed at various points along conduit system 540 and the pH value of the waste solution may be determined by an external pH meter or other means.

In one example, pH adjusting device 536 is configured to combine a basic pH adjusting agent with the waste solution at a concentration to increase the pH value of the waste solution by a pH unit of about 1.0 upstream from immersion tank 520 or catalytic system 521. In another example, pH adjusting device 536 is configured to increase the pH value of the waste solution by a pH unit of about 1.0 downstream from upstream from immersion tank 520 or catalytic system 521. The basic pH adjusting agent may contain an aqueous solution, an organic solution, or a mixture thereof and include alkaline or rare earth hydroxides and ammonium or alkylammonium hydroxides. Examples of basic pH adjusting agents include sodium hydroxide, potassium hydroxide, lithium hydroxide, calcium hydroxide, ammonium hydroxide, tetramethylammonium hydroxide, tetraethylammonium hydroxide, tetramethoxyammonium hydroxide, trimethoxyammonium hydroxide, dimethoxyammonium hydroxide, methoxyammonium hydroxide, tetraethoxyammonium hydroxide, triethoxyammonium hydroxide, diethoxyammonium hydroxide, ethoxyammonium hydroxide, derivatives thereof, and combinations thereof.

In one example, pH adjusting device 536 is configured to combine an acidic pH adjusting agent with the waste solution at a concentration to decrease the pH value of the waste solution by a pH unit of about 1.0 upstream from immersion tank 520 or catalytic system 521. In another example, pH adjusting device 536 is configured to decrease the pH value of the waste solution by a pH unit of about 1.0 downstream from upstream from immersion tank 520 or catalytic system 521. The acidic pH adjusting agent usually contains an aqueous solution. Examples of acidic pH adjusting agents include hydrochloric acid, sulfuric acid, hypophosphoric acid, hydrofluoric acid, nitric acid, citric acid, derivatives thereof, and combinations thereof.

At least one gas supply 518 may be connected to and in fluid communication with conduit system 540 for supplying a gas throughout waste abatement system 500. A flushing gas, such as an inert gas (e.g., nitrogen, argon, helium, or combinations thereof) may be supplied to feed tank 510 or waste abatement system 500 from gas supply 518. The flushing gas may be used to pressurize waste abatement system 500 or any portion thereof (e.g., feed tank 510, immersion tank 520, column systems 530a and 530b, and conduit system 540). Valve 517 may be used to control the gas flow from gas supply 518 to feed tank 510 or waste abatement system 500.

Degassing valves 554a-554g may be used to release or vent specified gases from waste abatement system 500. In one example, degassing valves 554a-554g may be adjusted to release undesirable gases (e.g., hydrogen gas) from conduit system 540 at a predetermined pressure, such as when an internal pressure of conduit system 540 is at or above about 760 Torr. Degassing exhaust valves may be positioned throughout waste abatement system 500 in various quantities, within a similar region, or between common stations. Degassing valve 554a may be positioned between feed tank 510 and immersion tank 520 or between feed tank 510 and catalytic system 521. Degassing valve 554b may also be positioned between feed tank 510 and immersion tank 520 or between feed tank 510 and catalytic system 521. Alternatively, degassing valve 554b may be included within catalytic system 521. Degassing valves 554c, 554d, 554e, and 554f may be positioned along conduit system 540 and between immersion tank 520 and column systems 530a and 530b. Degassing valve 554g may be positioned along exhaust line 553 and between feed tank 510 and ventilation system 552.

Generally, degassing valves 554a-554g may vent to the outside of waste abatement system 500 where the undesirable gas is drawn into ventilation system 552 through exhaust lines 553. Although not depicted, degassing valves 554a-554f may each be independently coupled to and in fluid communication with ventilation system 552 through exhaust line 553, similar to degassing valves 254a-254g coupled to and in fluid communication with ventilation system 252 through exhaust line 253, as depicted in FIG. 2. Valves that may be used as degassing valves 554a-554g include CKM Self-Closing Valve available from Plast-O-Matic Valves, Inc., located in Cedar Grove, N.J.

The flushing gas may be flowed through waste abatement system 500 to prevent or minimize a build-up of hydrogen gas or other undesirable gases within waste abatement system 500. In one example, the flushing gas purges any evolved hydrogen gas out of waste abatement system 500 to form an exhaust gas. The exhaust gas may be maintained with a hydrogen concentration of about 5 mol % or less, preferably, about 3.8 mol % or less, more preferably, about 1 mol % or less, and more preferably, about 0.5 mol % or less. The flushing gas may be used to pressurize waste abatement system 500 or any portion thereof (e.g., feed tank 510, immersion tank 520, column systems 530*a* and 530*b*, and conduit system 540). The over-pressure formed by the flushing gas advantageously reduces or eliminates the diffusion of oxygen gas into waste abatement system 500. Therefore, the waste solution may be maintained with a lower oxygen concentration than if exposed to the ambient air. For example, the waste solution may be maintained with an oxygen concentration of about 100 ppm or less, preferably, about 10 ppm or less, and more preferably, about 1 ppm or less.

In one embodiment, waste abatement system 500 has automatic controls with fail safes, as well as other safety features that may be used during waste abatement process 100. For example, if the internal pressure of waste abatement system 500 exceeds a predetermined pressure (e.g., over 760 Torr), the controller will automatically stop process 100. Waste effluents coming from process liquid source 512 and process by-pass source 514 may be completely stopped or have a reduced flow rate in order to stop process 100. In another example of a safety feature, if the flow of flushing or purge gas within waste abatement system 500 ceases, the controller will automatically stop process 100.

During step 110, the waste effluents from process liquid source 512 and/or process by-pass source 514 may be collected within feed tank 510 to form a waste solution. In one example, process liquid source 512 contains a depleted plating solution left over after a deposition process, such as an electroless deposition process or an electrochemical plating process. Generally, the waste solution may be a plating solution or contain a plating solution, such as a chemical plating solution, which may contain metal ions, reducing agents, or both, as well as other components. The metal ions may include copper, cobalt, tungsten, nickel, platinum, palladium, molybdenum, tin, chromium, silver, gold, zinc, ruthenium, rhodium, rhenium, alloys thereof, or combinations thereof. The reducing agents may include a phosphorous-containing reducing agent (e.g., hypophosphorous acid or hypophosphites), a boron-containing reducing agent (e.g., boranes, alkylamine boranes, dimethylamine borane, borohydrides), nitrogen-containing reducing agent (e.g., hydrazine, methylhydrazine, dimethylhydrazine, terbutylhydrazine, phenylhydrazine, or amines), complexes thereof, salts thereof, derivatives thereof, or combinations thereof. Other reducing agents include a reducing sugar agent or an organic reducing agent, such as glucose, glyoxylic acid monohydrate, formaldehyde, complexes thereof, salts thereof, derivatives thereof, or combinations thereof.

The waste solution may be exposed to an optional treatment during step 120 while being flowed from feed tank 510, through conduit system 540 to either immersion tank 520. The optional treatment may include increasing the temperature of waste solution, diluting the waste solution by adding water, or adjusting the pH value of the waste solution. An in-line heater (not shown) may be used to heat the waste solution while flowing through conduit system 540. In one example, the waste solution may be heated to or maintained at a temperature within a range from about 20° C. to about 120° C., preferably, from about 25° C. to about 100° C., and more preferably, from about 50° C. to about 80° C. Other treatments include adjusting the pH value of the waste solution by adding an acidic solution or a basic solution by pH adjusting device 536. In one example, the waste solution may be adjusted to have a pH value within a range from about 4 to about 12, preferably, from about 4.5 to about 10, and more preferably, from about 4 to about 9.

Waste abatement system 500 further contains feed pump 524, flow meter 526, and valve 525 connected to and in fluid communication with conduit system 540. Feed pump 524, flow meter 526, and valve 525 may be used to control the flow rate of the waste solution passing through waste abatement system 500. Also, waste abatement system 500 contains feed pump 532, sediment trap 534, and heat exchange 537 connected to conduit system 540. Heat exchange 537 is controlled by cooling system 538 and is in thermal communication with cooling system 538 by cooling line 539.

During step 130, the waste solution is exposed to catalytic system 521 containing catalytic heating element 560 during a demetallization process. Catalytic heating element 560 is usually a metallic heating element, such as resistively coupled heating element, and is used during the demetallization process of the waste solution. Heater controller 562 is resistively coupled to catalytic heating element 560 and may be used while heating catalytic heating element 560 to a predetermined temperature.

In one embodiment, catalytic heating element 560 may be contained within basket 519 that is positioned in immersion tank 520, as depicted in FIGS. 5A-5C. Basket 519 may be fixed within immersion tank 520, but preferably, basket 519 is removable and positioned on supports 527 by ridge 529. Alternatively, catalytic heating element 560 may be contained within immersion tank 520 without basket 519 and hang from holder 569 mounted on lid 565.

In one embodiment, basket 519 is composed of an electrically insulating material, such as plastic or ceramic. In an alternative embodiment, basket 519 is composed of a metallic wire basket. During the demetallization process, both catalytic heating element 560 and basket 519 may be coated by the metallic waste derived from the waste solution. Heater controller 562 could be resistively coupled to catalytic heating element 560 (FIG. 5A), basket 519 (FIG. 5B), or external heater 523 (FIG. 5C).

In one embodiment, FIG. 5B depicts catalytic system 521 containing basket 519 located within immersion tank 520. Basket 519 includes lid 565 connected to body 567 by hinge 563. Basket 519 may be positioned on supports 527 to hang within immersion tank 520. Handle 568 positioned on lid 565 may be used to remove basket 519 from immersion tank 520. Waste solution may flow into immersion tank 520 from inlet 564, be exposed to catalytic heating element 560 for a predetermined time, and subsequently flow from immersion tank 520 by outlet 566. Sediment trap 528 may be positioned at the lower portion of body 567 and is used to collect particulates from the waste solution.

In another embodiment, FIG. 5C depicts catalytic system 521 containing immersion tank 520 encompassed by external heater 523. Heater controller 562 may be used to regulate or control external heater 523. Basket 519 may be positioned on supports 527 to protrude into immersion tank 520.

In one embodiment, catalytic heating element 560 is a copper-containing heating element having a plating surface for forming metallic waste material deposited from the metal ions of the waste solution. In one example, catalytic heating element 560 is a copper heating element having a plating surface containing copper. In another example, catalytic heating element 560 is an iron-containing heating element (e.g., stainless steel) having a plating surface containing iron. Catalytic heating element 560 may be continuously or discontinuously coated by another catalytic material, such as palladium, platinum, iron, nickel, chromium, stainless steel, steel, cobalt, alloys thereof, or combinations thereof.

In one embodiment, waste solution contained within immersion tank 520 may be heated by catalytic heating element 560 resistively coupled to heater controller 562 (FIG. 5A). In another embodiment, waste solution contained within immersion tank 520 may be heated by catalytic basket 519 and/or catalytic heating element 560 resistively coupled to heater controller 562 (FIG. 5B). In another embodiment, external heater 523 and heater controller 562 are used to heat immersion tank 520, catalytic heating element 560, and the waste solution (FIG. 5C). In an alternative embodiment, waste solution contained within immersion tank 520 may be heated by an immersion heater (not shown). Generally, the waste solution, immersion tank 520 and/or catalytic heating element 560 may be heated to a temperature within a range from about 25° C. to about 100° C. In one example, catalytic heating element 560 is a copper heating element that has been pretreated to expose a surface of copper. Catalytic heating element 560 may be exposed to a dilute acid, such as hydrochloric acid or sulfuric acid. In another example, catalytic heating element 560 is a copper heating element that has been continuously or discontinuously coated with metallic cobalt or nickel. In other examples, the copper heating element has been continuously or discontinuously coated with metallic platinum or palladium.

The waste solution may be exposed to an optional treatment during step 140 while being flowed from either immersion tank 520 or catalytic system 521, through conduit system 540 to column systems 530a and 530b. The optional treatment may include adjusting the temperature of waste solution, diluting the waste solution by adding water, or adjusting the pH value of the waste solution. An in-line heater (not shown) may be used to heat the waste solution while flowing through conduit system 540. Alternative, cooling system 538 with heat exchange 537 may be used to cool the waste solution while flowing through conduit system 540. In one example, the waste solution may be heated to, cooled to, or maintained at a temperature within a range from about 20° C. to about 120° C., preferably, from about 25° C. to about 100° C., and more preferably, from about 50° C. to about 80° C. Other treatments include adjusting the pH value of the waste solution by adding an acidic solution or a basic solution by pH adjusting device 536. In one example, the waste solution may be adjusted to have a pH value within a range from about 4 to about 12, preferably, from about 4.5 to about 10, and more preferably, from about 4 to about 9.

During step 150, the waste solution is flowed from conduit system 540 through column systems 530a and 530b to further demetallize the waste solution during a de-ionization process. Metallic ions are removed from the waste solution while the waste solution is exposed to an ion-exchange resin within column systems 530a and 530b. The metallic ions that may be removed from the waste solution by column systems 530a and 530b include copper, cobalt, tungsten, molybdenum, tin, chromium, nickel, platinum, palladium, silver, gold, and combinations thereof.

In one embodiment, waste abatement system 500 may contain a single column system 530a or column system 530b having an ion-exchange resin or bed. In another embodiment, as depicted in FIG. 5A, waste abatement system 500 contains at least two column systems 530a and 530b connected in parallel or series with each other. By-pass line 541 may be positioned between two or more column systems 530a and 530b containing ion-exchange beds. Valves 543a, 543b, 543c, and 545 and by-pass line 541 may be used to direct the flow of the waste solution to column system 530a, column system 530b, or both. In another example, waste abatement system 500 may use detector 542 to determine when the ion-exchange bed has such low efficiency that by-pass line 541 may automatically be switched to for directing the waste solution from the less efficient ion-exchange bed to a second ion-exchange bed, such as between column system 530a to column system 530b, or vice versa.

In one example, column system 530b and by-pass line 541 may be by-passed by positioning valves 543c and 545 to direct the waste solution from conduit system 540, through column system 530a, and to detector 542, acid waste neutralization system 544, and/or collection tank 570. In another example, column system 530a and by-pass line 541 may be by-passed by positioning valves 543a, 543b, 543c, and 545 to direct the waste solution from conduit system 540, through column system 530b, and to detector 542, acid waste neutralization system 544, and/or collection tank 570. In another example, column systems 530a and 530b may both be used by positioning valves 543a, 543b, 543c, and 545 to direct the waste solution from conduit system 540, through column systems 530a and 530b, and to detector 542, acid waste neutralization system 544, and/or collection tank 570. In another example, column systems 530a and 530b may both be by-passed by positioning valves 543a, 543b, 543c, and 545 to direct the waste solution from conduit system 540, through by-pass line 541, and to detector 542, acid waste neutralization system 544, and/or collection tank 570.

Column systems 530a and 530b each contain at least one bed of an ion exchange resin which may include iminodiacetic resins, amidoxime resins, amino-phosphonic resins, bispicolylamine resins, derivatives thereof, or combinations thereof. In one embodiment, the ion-exchange resin is in proton form or acidic form, versus a salt form, such as sodium form. Ion exchange resins are available from Purolite Company, located in Bala Cynwyd, Pa. Examples include AMBERLITE™ IRC748 for metal removal (e.g., Co or Cu) and AMBERLITE™ IRA743 for boron removal, both available from Rohm and Haas, located in Philadelphia, Pa.

After the de-ionization process at step 150, the concentration of metal ions, reducing agents, hydrogen gas, or other components of the treated waste solution may be monitored or determined during step 160. The treated waste solution exiting column systems 530a and 530b is transferred through conduit system 540, pass detector 542 (step 160), and flowed to acid waste neutralization system 544 (step 170) or collection tank 570 (step 180). If a predetermined concentration of a waste solution component (e.g., metal ion concentration) has not been met, then the treated waste solution may be recirculated or looped through column systems 530a and 530b. In one embodiment, detector 542 may be used to determine the concentration of metal ions, reducing agents, or hydrogen gas within the treated waste solution.

In one embodiment, the treated waste solution may be monitored or determined during step 160 to have a metal ion concentration of about 5 ppm or less, preferably, about 1 ppm or less, more preferably, about 0.1 ppm or less, and more preferably, about 10 ppb or less at step 160. The metal ions include copper, cobalt, tungsten, nickel, platinum, palladium, molybdenum, chromium, silver, gold, zinc, ruthenium, rhodium, rhenium, and combinations thereof. In one example, the treated waste solution contains a copper concentration of about 1 ppm or less, preferably, about 0.1 ppm or less, and more preferably, about 10 ppb or less. In another example, the treated waste solution contains a cobalt concentration of about 1 ppm or less, preferably, about 0.1 ppm or less, and more preferably, about 10 ppb or less.

Also, the treated waste solution may be monitored or determined during step 160 to have a reducing agent concentration of about 5 ppm or less, preferably, about 1 ppm or less, more preferably, about 0.1 ppm or less, and more preferably, about 10 ppb or less during step 160. In one example, the treated waste solution contains a DMAB concentration of about 1 ppm or less, preferably, about 0.1 ppm or less, and more preferably, about 10 ppb or less. In another example, the treated waste solution contains a hypophosphite concentration of about 1 ppm or less, preferably, about 0.1 ppm or less, and more preferably, about 10 ppb or less.

In one embodiment, detector 542 is a spectroscopic detector coupled with conduit system 540 and used to perform in situ spectroscopic analysis of waste solution downstream from column systems 530a and 530b during step 160. For example, conduit system 540 may be attached in fluid communication with detector 542 so that waste solution passes through detector 542. In another example, detector 542 may be coupled outside of conduit system 540 over a window (not shown) positioned on conduit system 540. Detector 542 may be networked with the control system and remotely monitored by an operator. Detector 542 may be an UV-vis spectrometer, an IR or FT-IR spectrometer, a Raman spectrometer, or derivatives thereof. Spectrometers that may be used as detector 542 for UV-vis, IR, or FT-IR spectroscopy are available from Thermo Electron Corporation. Spectrometers that may be used as detector 542 for Raman spectroscopy are available from Thermo Electron Corporation and Kaiser Optical Systems.

In another embodiment, outlet 572 may be used to remove an aliquot sample of waste solution downstream from column systems 530a and 530b during step 160. Subsequently, the aliquot sample may be analyzed to determine the concentration of metal ions, reducing agents, hydrogen gas, or other components of the waste solution. In one example, the aliquot sample may be analyzed by an inductively-coupled plasma (ICP) analysis process. In another example, the aliquot sample may be analyzed by an iodometric titration technique. Other examples for analyzing aliquot samples of the waste solution include UV-vis, FT-IR, or Raman spectroscopic processes.

EXAMPLES

Example 1

A waste solution (e.g., depleted aqueous electroless-plating solution) has a pH value of about 8 and contains about 65 ppm of cobalt ions and about 120 ppm of dimethylamine borane complex (($CH_3$)$_2$NH.BH$_3$), DMAB). The waste solution, with a flow rate of about 1 L/min, was flowed through a waste abatement system similar to system 400 depicted in FIG. 4A. The waste solution was pumped through two catalytic conduits (e.g., coiled copper tubes) having a length of about 25 feet. A purge gas (e.g., nitrogen gas) was flowed through the system having a flow rate within a range from about 0.25 cubic feet per minute (CFM) to about 0.5 CFM. The purge gas helps to purge any evolved hydrogen gas byproduct and to exclude any oxygen gas throughout the system. The temperature of the waste solution was pre-heated to about 70° C. by flowing the waste solution through an in-line heater (e.g., a fluoropolymer in-line heater). The coiled copper tubes were wrapped with heat-tape and maintained the waste solution at about 70° C.

An aliquot sample of the waste solution was obtained post exposure to the coiled copper tubes and was analyzed for cobalt content by an inductively coupled plasma technique, which yielded a concentration of about 22 ppm of cobalt. The same sample was analyzed for DMAB content by an iodometric titration technique, which yielded a value of less than about 6 ppm±0.2 ppm of DMAB. Analysis of hydrogen gas mixed with nitrogen at various exhaust points between the collection tank and post-coiled copper tubes yielded a value of about 0.25 molar percent (mol %) of hydrogen in nitrogen, well below the toxic level (TLV) of 3.8 mol % in air.

Subsequent to exposing the waste solution to the coiled copper tubes, the pH was adjusted to about 5, and the waste solution was pumped through a down-flow service ion-exchange bed. The ion-exchange bed contained about 4 ft$^3$ of iminodiacetic acid ion-exchange resin and was in proton form versus the sodium form. Both UV-vis spectroscopic analysis and ICP of the waste solution yielded a cobalt concentration of about 0.1 ppm of cobalt post ion-exchange. In another example, the waste solution by-passed the ion-exchange apparatus and was flowed to and treated by the acid-waste neutralization system.

Example 2

A waste solution (e.g., depleted aqueous electroless-plating solution) has a pH value of about 9 and contains about 85 ppm of cobalt ions and about 200 ppm of DMAB. The waste solution, with a flow rate of about 1 L/min, was flowed through a waste abatement system similar to system 300 depicted in FIG. 3A. The waste solution was exposed to about 3 ft$^3$ of steel wool contained within a perforated plastic basket positioned inside a 20 L immersion tank. The waste solution was exposed to the steel wool for about 20 minutes while continuously flowing through the immersion tank. A purge gas (e.g., nitrogen gas) was flowed through the system having a flow rate within a range from about 0.25 CFM to about 0.5 CFM. The purge gas helps to purge any evolved hydrogen gas by-product and to exclude any oxygen gas throughout the system. The temperature of the waste solution was pre-heated to about 65° C. by flowing the waste solution through an in-line heater (e.g., a fluoropolymer in-line heater). An immersion heater, contained in the immersion tank, maintained the waste solution at about 65° C. Visual inspection of the waste solution in contact with the steel wool revealed vigorous evolution of hydrogen gas, in the form of bubbles, as well the formation of a dull grey cobalt film on the lustrous coarse steel wool.

An aliquot sample of the waste solution was obtained post exposure to the steel wool and was analyzed for cobalt content by an inductively coupled plasma technique, which yielded a concentration of about 32 ppm of cobalt. The same sample was analyzed for DMAB content by an iodometric titration technique, which yielded a value of less than about 6 ppm±0.2 ppm of DMAB. Analysis of hydrogen gas mixed with nitrogen at various exhaust points between the collection tank and post-steel wool yielded a value of about 0.20 mol % of hydrogen in nitrogen, well below the TLV of 3.8 mol % in air.

Subsequent to exposing the waste solution to the steel wool, the pH was adjusted to about 5, and the waste solution was pumped through a down-flow service ion-exchange bed. The ion-exchange bed contained about 4 ft$^3$ of iminodiacetic acid ion-exchange resin and was in proton form versus the sodium form. Both UV-vis spectroscopic analysis and ICP of the waste solution yielded a cobalt concentration of about 0.1 ppm of cobalt post ion-exchange. In another example, the waste solution by-passed the ion-exchange apparatus and was flowed to and treated by the acid-waste neutralization system.

Example 3

A waste solution (e.g., depleted aqueous electroless-plating solution) has a pH value of about 8 and contains about 2,000 ppm of copper ions. The waste solution, with a flow rate of about 1 L/min, was flowed through a waste abatement system similar to system 300 depicted in FIG. 3A. The waste solution was exposed to about 3 ft$^3$ of steel wool contained within a perforated plastic basket positioned inside a 10 L immersion tank. The waste solution was exposed to the steel wool for about 10 minutes while continuously flowing through the immersion tank. A purge gas (e.g., nitrogen gas) was flowed through the system having a flow rate within a range from about 0.25 CFM to about 0.5 CFM. The purge gas helps to purge any evolved hydrogen gas by-product and to exclude any oxygen gas throughout the system. The temperature of the waste solution was pre-heated to about 70° C. by flowing the waste solution through an in-line heater (e.g., a fluoropolymer in-line heater). An immersion heater, contained in the immersion tank, maintained the waste solution at about 70° C. Visual inspection of the waste solution in contact with the steel wool revealed vigorous evolution of hydrogen gas, in the form of bubbles, as well the formation of a dull orange copper film on the lustrous coarse steel wool. An aliquot sample of the waste solution was obtained post exposure to the steel wool and was analyzed for copper content by an inductively coupled plasma technique, which yielded a concentration of about 200 ppm of copper.

Subsequent to exposing the waste solution to the steel wool, the pH was adjusted to about 5, and the waste solution was pumped through a down-flow service ion-exchange bed. The ion-exchange bed contained about 4 ft$^3$ of iminodiacetic acid ion-exchange resin and was in proton form versus the sodium form. Both UV-vis spectroscopic analysis and ICP of the waste solution yielded a copper concentration of about 0.5 ppm of copper post ion-exchange. In another example, the waste solution by-passed the ion-exchange apparatus and was flowed to and treated by the acid-waste neutralization system.

Example 4

A waste solution (e.g., depleted aqueous electroless-plating solution) has a pH value of about 9 and contains about 85 ppm of nickel ions complexed with citrate and about 180 ppm of DMAB. The waste solution, with a flow rate of about 12 L/min, was flowed through a waste abatement system similar to system 500 depicted in FIG. 5A. The waste solution was exposed to a resistively coupled copper heating element positioned inside a 120 L immersion tank. The waste solution was exposed to the copper heating element for about 10 minutes while continuously flowing through the immersion tank. A purge gas (e.g., nitrogen gas) was flowed through the system having a flow rate within a range from about 0.25 CFM to about 0.5 CFM. The purge gas helps to purge any evolved hydrogen gas by-product and to exclude any oxygen gas throughout the system. The temperature of the waste solution was pre-heated to about 70° C. by flowing the waste solution through an in-line heater (e.g., a fluoropolymer in-line heater). The copper heating element was connected to a controller to resistively heat the copper heating element to about 70° C. The immersed copper heating element maintained the waste solution at about 70° C. Visual inspection of the waste solution in contact with the steel wool revealed vigorous evolution of hydrogen gas, in the form of bubbles, as well the formation of a dull grey nickel film on the lustrous coarse steel wool.

An aliquot sample of the waste solution was obtained post exposure to the steel wool and was analyzed for nickel content by an inductively coupled plasma technique, which yielded a concentration of about 10 ppm of nickel. The same sample was analyzed for DMAB content by an iodometric titration technique, which yielded a value of less than about 6 ppm±0.2 ppm of DMAB. Analysis of hydrogen gas mixed with nitrogen at various exhaust points between the collection tank and post-copper heating element yielded a value of about 0.20 mol % of hydrogen in nitrogen, well below the TLV of 3.8 mol % in air.

Subsequent to exposing the waste solution to the copper heating element, the pH was adjusted to about 5, and the waste solution was pumped through a down-flow service ion-exchange bed. The ion-exchange bed contained about 4 ft$^3$ of iminodiacetic acid ion-exchange resin and was in proton form versus the sodium form. Both UV-vis spectroscopic analysis and ICP of the waste solution yielded a nickel concentration of about 0.1 ppm of nickel post ion-exchange. In another example, the waste solution by-passed the ion-exchange apparatus and was flowed to and treated by the acid-waste neutralization system.

Example 5

A waste solution (e.g., depleted aqueous electroless-plating solution) has a pH value of about 10 and contains about 95 ppm of cobalt ions and about 200 ppm of DMAB. The waste solution, with a flow rate of about 1 L/min, was flowed through a waste abatement system similar to system 300 depicted in FIG. 3A. The waste solution was exposed to about 3 ft$^3$ of steel wool contained within a perforated plastic basket positioned inside a 20 L immersion tank. The waste solution was exposed to the steel wool for about 20 minutes while continuously flowing through the immersion tank. A purge gas (e.g., nitrogen gas) was flowed through the system having a flow rate within a range from about 0.25 CFM to about 0.5 CFM. The purge gas helps to purge any evolved hydrogen gas by-product and to exclude any oxygen gas throughout the system. The temperature of the waste solution was pre-heated to about 50° C. by flowing the waste solution through an in-line heater (e.g., a fluoropolymer in-line heater). An immersion heater, contained in the immersion tank, maintained the waste solution at about 50° C. Visual inspection of the waste solution in contact with the steel wool revealed vigorous evolution of hydrogen gas, in the form of bubbles, as well the formation of a dull grey cobalt film on the lustrous coarse steel wool.

An aliquot sample of the waste solution was obtained post exposure to the steel wool and was analyzed for cobalt content by an inductively coupled plasma technique, which yielded a concentration of about 34 ppm of cobalt. The same sample was analyzed for DMAB content by an iodometric titration technique, which yielded a value of less than about 6 ppm±0.2 ppm of DMAB. Analysis of hydrogen gas mixed with nitrogen at various exhaust points between the collection tank and post-steel wool yielded a value of about 0.20 mol % of hydrogen in nitrogen, well below the TLV of 3.8 mol % in air.

Subsequent to exposing the waste solution to the steel wool, the pH was adjusted to about 5, and the waste solution was pumped through a down-flow service ion-exchange bed. The ion-exchange bed contained about 4 ft$^3$ of iminodiacetic acid ion-exchange resin and was in proton form versus the sodium form. Both UV-vis spectroscopic analysis and ICP of the waste solution yielded a cobalt concentration of about 0.1 ppm of cobalt post ion-exchange. In another example, the waste solution by-passed the ion-exchange apparatus and was flowed to and treated by the acid-waste neutralization system.

While the foregoing is directed to embodiments of the invention, other and further embodiments of the invention may be devised without departing from the basic scope thereof, and the scope thereof is determined by the claims that follow.

The invention claimed is:

1. A method for removing metal ions from a waste solution, comprising:
    flowing a waste solution into a conduit system from a reservoir, wherein the waste solution contains metal ions and at least one reducing agent, and the conduit system is substantially free of oxygen gas;
    flowing the waste solution into an immersion tank coupled with the conduit system;
    exposing a heating element within the immersion tank to the waste solution while depositing a metallic film of the metal ions onto a surface of the heating element;
    degassing hydrogen gas from the waste solution through release valves positioned along the conduit system; and
    exposing the waste solution to an ionic exchange resin to further remove metal ions therefrom.

2. The method of claim 1, wherein the waste solution is a plating solution comprising at least one element selected from the group consisting of copper, cobalt, tungsten, molybdenum, chromium, nickel, platinum, palladium, silver, gold, and combinations thereof.

3. The method of claim 2, wherein the at least one reducing agent comprises a phosphorous-containing reducing agent, a boron-containing reducing agent, a nitrogen-containing reducing agent, or combinations thereof.

4. The method of claim 1, wherein a flushing gas is co-flowed with the waste solution to maintain the conduit system substantially free of oxygen gas, and the flushing gas comprises a gas selected from the group consisting of nitrogen, argon, helium, and combinations thereof.

5. The method of claim 4, wherein the waste solution is maintained with an oxygen concentration of about 100 ppm or less.

6. The method of claim 5, wherein the oxygen concentration is about 10 ppm or less.

7. The method of claim 1, wherein the surface of the heating element comprises a catalytic material selected from the group consisting of palladium, platinum, iron, nickel, chromium, stainless steel, steel, copper, cobalt, alloys thereof, and combinations thereof.

8. The method of claim 7, wherein the heating element is heated to a temperature within a range from about 25° C. to about 100° C.

9. The method of claim 1, wherein the release valves are degassing valves adjusted to release the hydrogen gas when an internal pressure of the conduit system is above about 760 Torr.

10. The method of claim 1, wherein a basic pH adjusting agent is combined with the waste solution at a concentration to increase a pH value of the waste solution by a pH unit of about 1.0 prior to exposing the heating element to the waste solution.

11. The method of claim 1, wherein a concentration of the metal ions within the waste solution is monitored after being exposed to the ionic exchange resin, and the concentration of the metal ions is reduced to about 20 ppm or less.

12. The method of claim 11, wherein the concentration of the metal ions is about 1 ppm or less.

* * * * *